(12) United States Patent
Wu et al.

(10) Patent No.: US 8,095,507 B2
(45) Date of Patent: Jan. 10, 2012

(54) AUTOMATED TOPOLOGY-BASED STATISTICS MONITORING AND PERFORMANCE ANALYSIS

(75) Inventors: Jingwei Wu, Foster City, CA (US); Nimar S Arora, Union City, CA (US); Lik Wong, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 558 days.

(21) Appl. No.: 12/189,115

(22) Filed: Aug. 8, 2008

(65) Prior Publication Data
US 2010/0036810 A1    Feb. 11, 2010

(51) Int. Cl.
G06F 17/30 (2006.01)
(52) U.S. Cl. ........ 707/634; 707/635; 707/636; 707/637; 707/686; 707/690
(58) Field of Classification Search .......... 707/609, 707/655, 659, 634–637, 688, 690; 726/22; 455/445; 370/235, 225, 216
See application file for complete search history.

(56) References Cited

U.S. PATENT DOCUMENTS

| | | | |
|---|---|---|---|
| 6,023,730 A * | 2/2000 | Tani | 709/231 |
| 6,889,231 B1 | 5/2005 | Souder et al. | |
| 7,031,974 B1 | 4/2006 | Subramaniam | |
| 7,940,685 B1 * | 5/2011 | Breslau et al. | 370/251 |
| 2002/0105911 A1 * | 8/2002 | Pruthi et al. | 370/241 |
| 2003/0198235 A1 * | 10/2003 | Weldon et al. | 370/401 |
| 2003/0214913 A1 * | 11/2003 | Kan et al. | 370/252 |
| 2004/0008707 A1 * | 1/2004 | Nakamichi et al. | 370/401 |
| 2004/0034640 A1 | 2/2004 | Jain et al. | |
| 2004/0202158 A1 * | 10/2004 | Takeno et al. | 370/389 |
| 2005/0038831 A1 | 2/2005 | Souder et al. | |
| 2006/0123477 A1 * | 6/2006 | Raghavan et al. | 726/22 |
| 2006/0242694 A1 * | 10/2006 | Gold et al. | 726/13 |
| 2006/0291473 A1 * | 12/2006 | Chase et al. | 370/395.5 |
| 2007/0064611 A1 * | 3/2007 | He | 370/236.2 |
| 2008/0114801 A1 * | 5/2008 | Singh | 707/102 |
| 2008/0126354 A1 | 5/2008 | Wang et al. | |
| 2008/0250057 A1 * | 10/2008 | Rothstein et al. | 707/102 |
| 2009/0296571 A1 * | 12/2009 | McCourt | 370/225 |

OTHER PUBLICATIONS

Entire Prosecution History of U.S. Appl. No. 11/831,478 filed on Jul. 31, 2007 by Lik Wong et al.
Oracle® Streams Replication Administrator's Guide, 10g Release 1 (10.1), Part No. B10728-01 by Oracle® Corporation of Redwood Shores, California, Dec. 2003 pp. 364.

(Continued)

*Primary Examiner* — Hanh Thai
(74) *Attorney, Agent, or Firm* — Silicon Valley Patent Group LLP; Omkar Suryadevara

(57) ABSTRACT

A computer is programmed to parse a network that interconnects databases in a distributed database system, into a number of paths, wherein each path starts in a source database that is a source of changes and ends in a destination database that uses the changes to replicate the source database. The computer identifies databases that occur within each path in the network, and queries the identified databases to obtain statistics for each path. Statistics along each path are analyzed automatically, to identify a component in each path as a candidate for further investigation. The identified component may be marked as a bottleneck e.g. if there are no other paths connected to it. Alternatively the identified component may be a source of changes for another path that has a bottleneck or that has another candidate for further investigation. The identified bottleneck is displayed to the user with recommendations for improvement.

18 Claims, 18 Drawing Sheets

OTHER PUBLICATIONS

Arora, N. S. "Oracle® Streams for Near Real Time Asynchronous Replication", Proc. VLBD Ws. Design, Implementation, and Deployment of Database Replication, 2005, pp. 7.

Oracle® Database Performance Tuning Guide, 10g Release 2 (10gR2), Part No. B14211-03, published Mar. 2008, by Oracle® Corporation of Redwood Shores, California, pp. 474.

Oracle® Streams Replication Administrator's Guide, 11g Release 1 (11.1), product B28322-02, published Sep. 2007, by Oracle® Corporation of Redwood Shores, California, pp. 434.

Oracle® Streams Concepts and Administration, 11g Release 1 (11.1) Part No. B28321-02, Sep. 2007, pp. 1-350.

Oracle® Streams Concepts and Administration, 11g Release 1 (11.1) Part No. B28321-02, Sep. 2007, pp. 351-724.

\* cited by examiner

FIG. 2C

```
<statistics>= <capture> <queue> [<psender> <preceiver> <queue> ] <apply> <bottleneck>
             220      215    250                                 270    293
             221      222    223       223                       224
<capture> = '|<C>' <name> <msgs captured/sec> <msgs enqueued/sec> <latency>
225  226    227         228          229
'LMR' <idl%> <flwctrl%> <topevt%> <topevt>
230  231    232         233          234      234T
'LMP' (<parallelism>) <idl%> <flwctrl%> <topevt%> <topevt>
235  236    237         238          238T
'LMB' <idl%> <flwctrl%> <topevt%> <topevt>
239  240    241         242          242T
'CAP' <idl%> <flwctrl%> <topevt%> <topevt>
     243         244          245       246      247     248    249   249T
'CAP+PS' <msgs sent/sec> <bytes sent/sec> <latency> <idl%> <flwctrl%> <topevt%> <topevt>
          271    272    273                 274      275
<apply> = '|<A>' <name> <msgs applied/sec> <txns applied/sec> <latency>
276  277    278         279          279T
'PS+PR' <idl%> <flwctrl%> <topevt%> <topevt>
280  281    282         283          283T
'APR' <idl%> <flwctrl%> <topevt%> <topevt>
284  285    286         287          287T
'APC' <idl%> <flwctrl%> <topevt%> <topevt>
288  289         290          291    292    292T
'APS' (<parallelism>) <idl%> <flwctrl%> <topevt%> <topevt>
          251    252         253          254                255
<queue> = '|<Q>' <name> <msgs enqueued/sec> <msgs spilled/sec> <msgs in queue>
               256    257         258          259         260    261        262
<psender> = '|<PS>' <name> <msgs sent/sec> <bytes sent/sec> <latency> <idl%> <flwctrl%>
    263    264
<topevt%> <topevt>
              265    266    267    268         269    269T
<preceiver> = '|<PR>' <name> <idl%> <flwctrl%> <topevt%> <topevt>
                294    295    296         297       298    299    299T
<bottleneck>= '|<B>' <name> <sub_name> <sessionid> <serial#> <topevt%> <topevt>
```

FIG. 2D

| Abbreviation | Description |
| --- | --- |
| A | Apply process |
| APC | Coordinator process used by an apply process |
| APR | Reader server used by an apply process |
| APS | Apply server used by an apply process |
| B | Bottleneck |
| C or CAP | Capture process |
| CAP+PS | Capture process session and propagation sender in a combined capture and apply configuration |
| CCA | Combined capture and apply (Y indicates that it is used for the path; N indicates that it is not used for the path.) |
| flwctrl | Flow control |
| idl | Idle |
| LMB | Builder server used by a capture process (LogMiner builder) |
| LMP | Preparer server used by a capture process (LogMiner preparer) |
| LMR | Reader server used by a capture process (LogMiner reader) |
| msgs | Messages |
| preceiver or PR | Propagation receiver |
| psender or PS | Propagation sender |
| PS+PR | Propagation sender and propagation receiver in a combined capture and apply configuration |
| Q | Queue |
| serial# | Session serial number |
| sec | Second |
| sid | Session identifier |
| sub_name | Subcomponent name |
| topevt | Top event |

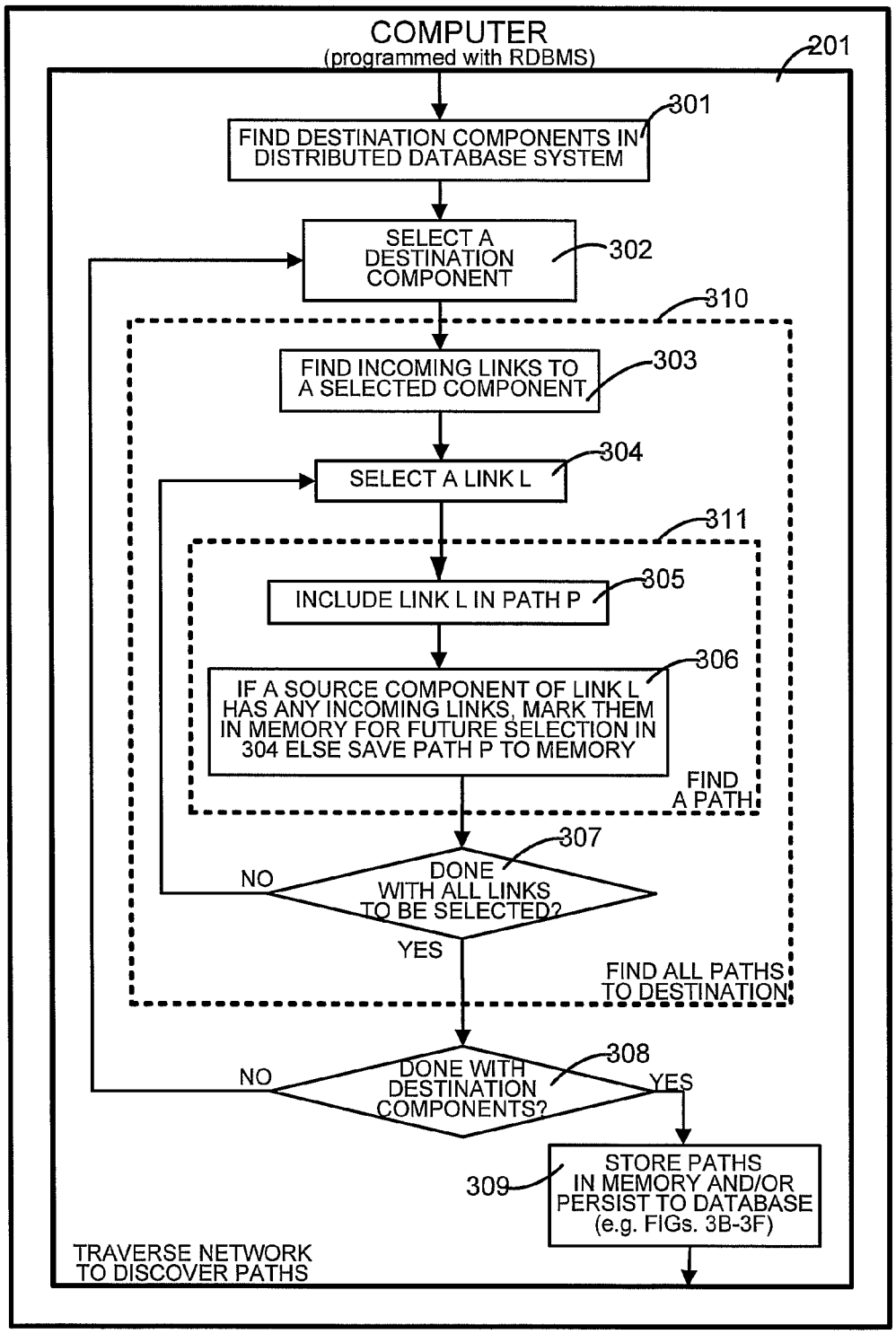

FIG. 3B

| Path_id | Pos | Node |
|---|---|---|
| 1 | 1 | Cap |
| 1 | 2 | Q1 |
| 1 | 3 | App1 |

FIG. 3C

| Path_id | Pos | Node |
|---|---|---|
| 2 | 1 | Cap |
| 2 | 2 | Q1 |
| 2 | 3 | PS1c |
| 2 | 4 | PR3b |
| 2 | 5 | Q3b |
| 2 | 6 | App3 |

FIG. 3F

| Path_id | Pos | Node |
|---|---|---|
| 5 | 1 | Q4b |
| 5 | 2 | App4b |

FIG. 3D

| Path_id | Pos | Node |
|---|---|---|
| 3 | 1 | Cap |
| 3 | 2 | Q1 |
| 3 | 3 | PS1b |
| 3 | 4 | PR3a |
| 3 | 5 | Q3a |
| 3 | 6 | PS3 |
| 3 | 7 | PR4b |
| 3 | 8 | Q4a |
| 3 | 9 | App4a |

FIG. 3E

| Path_id | Pos | Node |
|---|---|---|
| 4 | 1 | Cap |
| 4 | 2 | Q1 |
| 4 | 3 | PS1a |
| 4 | 4 | PR2 |
| 4 | 5 | Q2 |
| 4 | 6 | PS2 |
| 4 | 7 | PR4a |
| 4 | 8 | Q4a |
| 4 | 9 | App4a |

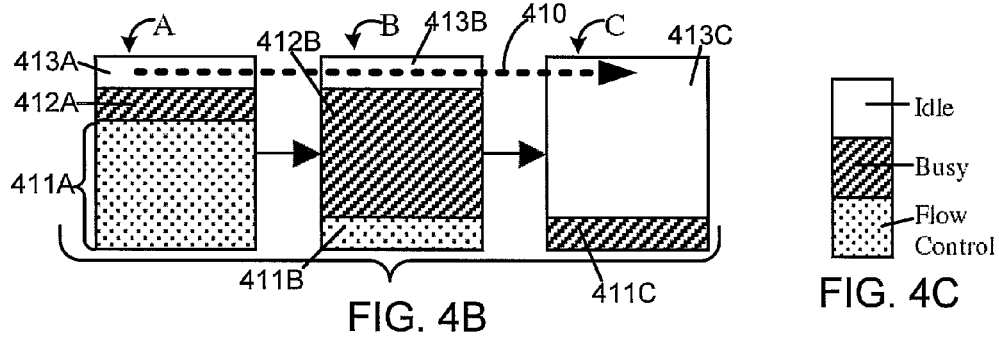
FIG. 4B
FIG. 4C
FIG. 4A
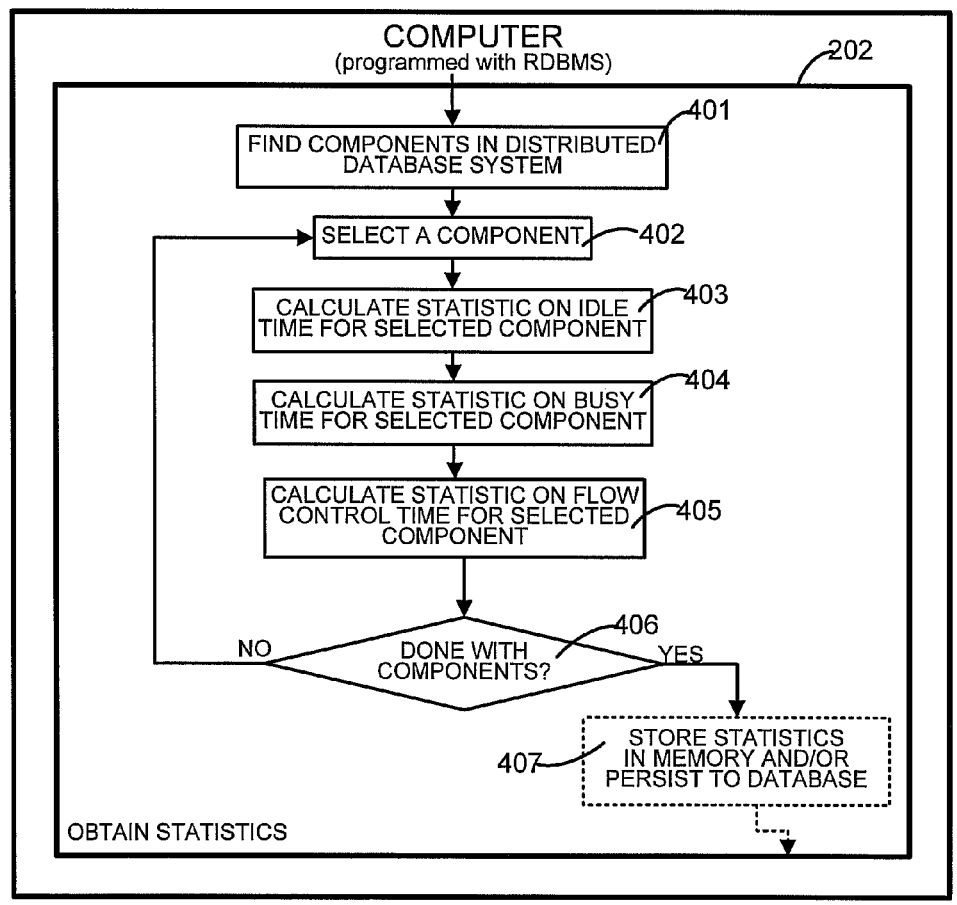

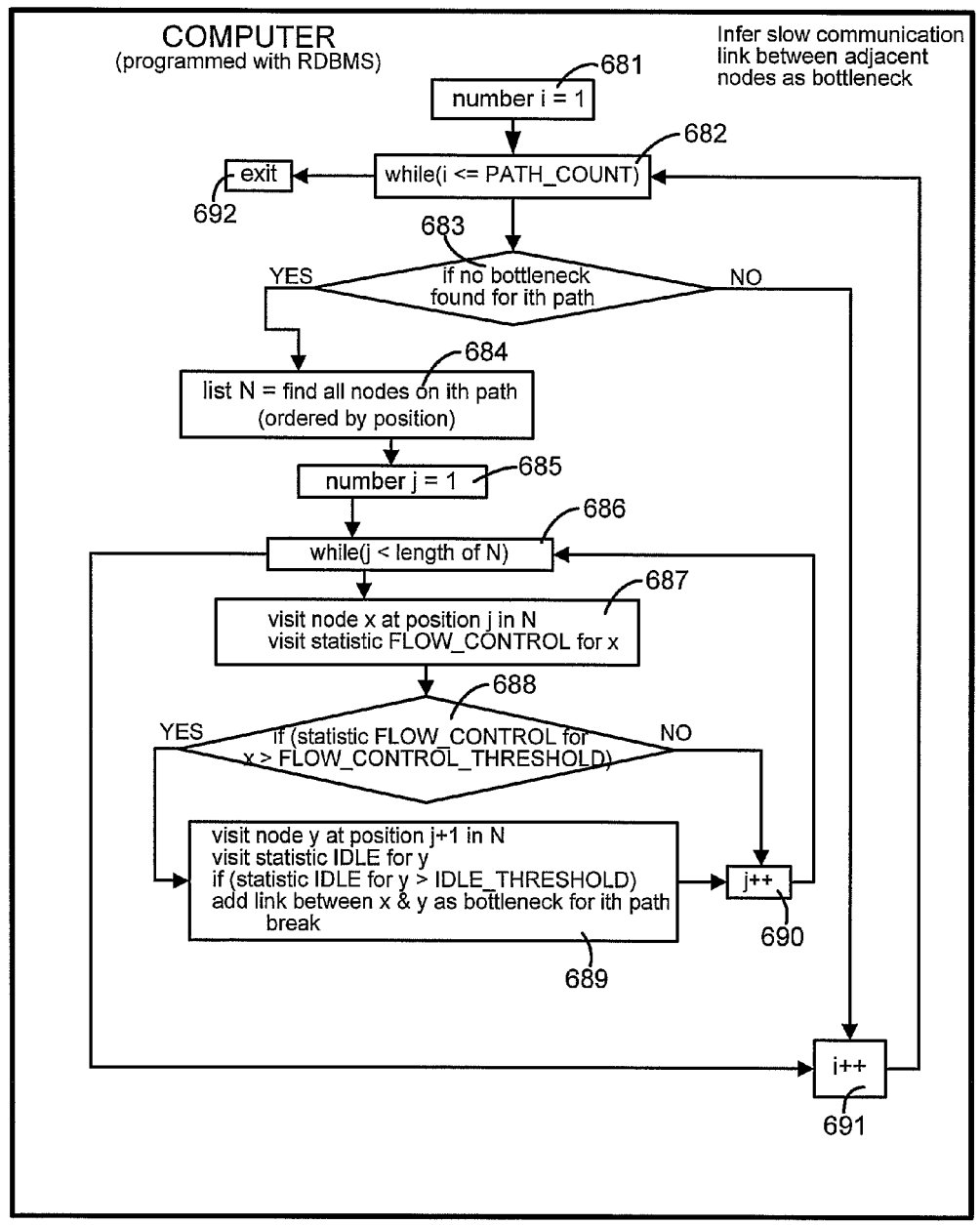

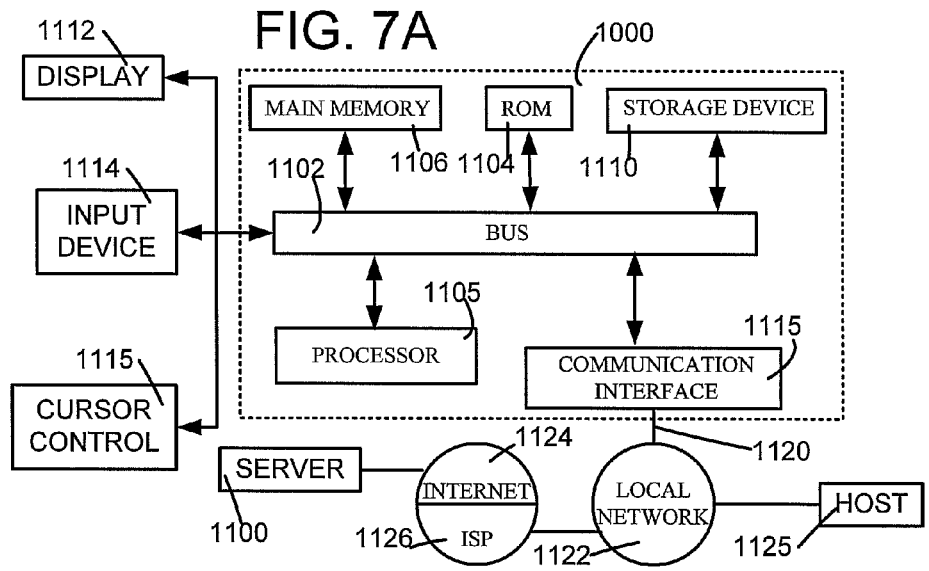
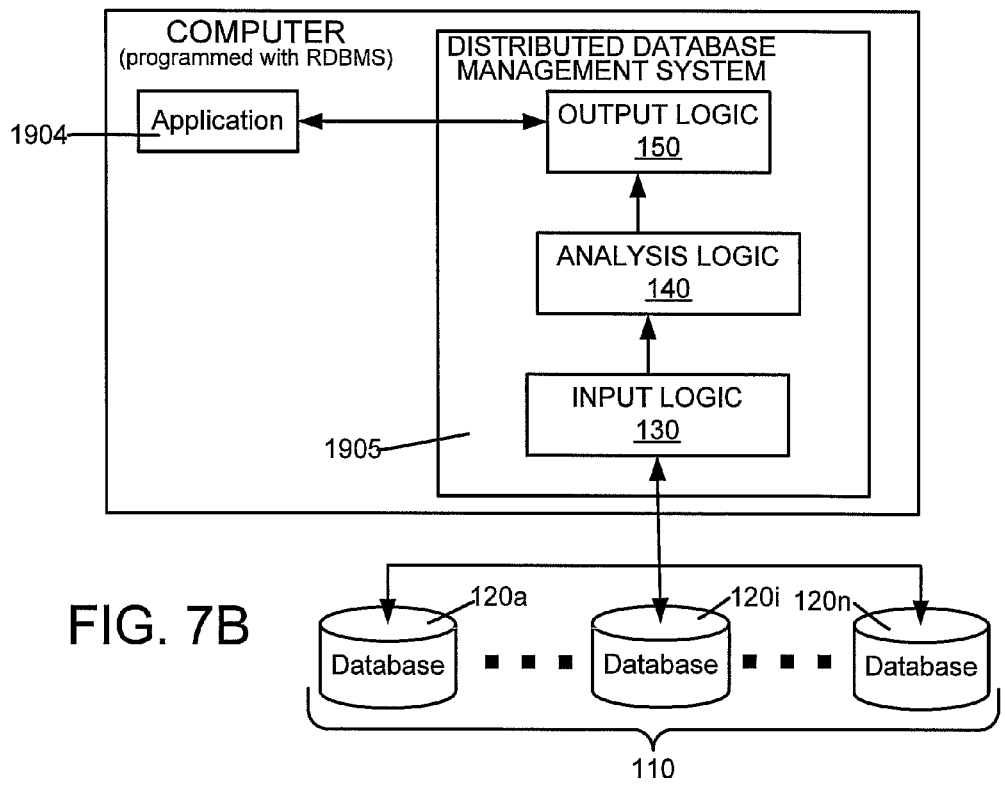

AUTOMATED TOPOLOGY-BASED STATISTICS MONITORING AND PERFORMANCE ANALYSIS

BACKGROUND

In distributed computing systems, multiple processes on different sites (e.g., PDA, personal computer, and main frame), which may be geographically sparsely located on the globe, often access various resources (e.g., memory and network) and cooperate to achieve a specific goal. One example is data replication in a large distributed database management system. Replication is a process of sharing database objects and/or data between multiple databases in distributed computing systems. To maintain replicated database objects at multiple databases, a change to a database object and/or data at a database is shared with other databases. In this way, database objects are kept synchronized in all databases involved in the replication.

In a prior art distributed database management system a database where a change originates is called a source database 120 which is maintained by a source computer 100, and a database where a change is replicated is called a destination database 122 which is maintained by a destination computer 102. Multiple processes in the distributed database management system cooperate with one another in a pipeline fashion to ensure data of an enterprise or corporation is properly replicated in real time from one site to another site or from one computer to many different computers. At a source database 120, a capture process in source computer 100 captures corporate data of interest and manipulates the captured data in memory 110 before sending it (e.g. as a logical change record, or LCR) into a network. For more information on LCRs, please see Oracle® Streams Replication Administrator's Guide, 10g Release 1 (10.1), Part Number B10728-01 by Oracle® Corporation of Redwood Shores, Calif., and this document is hereby incorporated by reference herein in its entirety.

At a destination database 122, processes in a destination computer 102 receive the corporate data (e.g. LCRs) from the network and perform transformation in memory 112 into user-requested form then save the data to the disk. In the configuration illustrated in FIG. 1A, an intermediate computer 104 is located in the network, between source computer 100 and destination computer 102. In this configuration, the changes passing through intermediate computer 104 are not persisted to database 124 therein because database 124 does not replicate database 120. However, intermediate computer 104 has one or more processes, such as PR2 and PS2 shown in FIG. 1B that cooperate with processes of the source and destination databases, and various resources such as memory and network, to form a distributed computing system. Also as shown by Database2 and Database3 in FIG. 1B, there may be multiple intermediate databases, and as shown by process App3 an intermediate database Database3 may replicate the source database Database1.

Various examples of distributed database management systems are described in the following patents each of which is incorporated by reference herein in its entirety as background: U.S. Pat. No. 7,031,974 by Mahesh Subramaniam entitled "Replicating DDL Changes Using Streams" and U.S. Pat. No. 6,889,231 by Benny Souder et al. entitled "Asynchronous Information Sharing System." See also the following article which is incorporated by reference herein in its entirety, entitled "Oracle® Streams for Near Real Time Asynchronous Replication" by Nimar S. Arora, Proc. VLDB Ws. Design, Implementation, and Deployment of Database Replication, 2005.

It is challenging and time-consuming to manually collect and analyze performance data from multiple processes in a distributed database management system. For example, to diagnose a performance problem in systems of the type shown in FIGS. 1A and 1B, a user may operate prior art tools provided by the database management system to query and review statistics that are available for each database individually. For examples of the types of tools available for a single database, see Oracle® Database Performance Tuning Guide, 10g Release 2 (10gR2), Part Number B14211-03, published March 2008 by Oracle® Corporation of Redwood Shores, Calif., and this document is hereby incorporated by reference herein in its entirety. Specifically, in operating such a tool, a user typically runs a SQL script in an Oracle® database to generate a report that displays statistical information related to the active session history (ASH) of selected sessions during a specified duration in that database. Alternatively, the user may view the same information, for a given database, through a graphical user interface provided by the Oracle Enterprise Manager.

Prior art tools for collecting statistics in distributed database management systems that are known to the current inventors are designed for a single database. A user typically operates the tool in each individual database, to query statistics about that particular database. The user may manually analyze such single-database statistics to identify a performance problem. However, the inventors of the current patent application note that manual analysis is labor intensive, error prone, and does not accurately account for system-level issues that arise from interactions between multiple databases. The current inventors further note that manual analysis is labor intensive and time consuming, especially in real life systems involving tens of source and destination computers interconnected by a communications network, which can be a wide area network (WAN) that connects computers in different cities. Accordingly, the current inventors believe that an automated tool is needed to perform statistics collection and analysis, for use in identifying performance problems in a distributed database management system.

SUMMARY

In accordance with the invention, a computer is programmed to parse a network that interconnects databases in a distributed database system, into a number of paths, wherein each path starts in a database ("source database") that is a source of changes and ends in another database ("destination database") that receives the changes and uses the changes to replicate the source database. A path from a source database to a destination database may pass through zero, one or more intermediate databases in the distributed database system. Moreover, a destination database that receives changes may itself form a source database for yet another database. The computer is programmed to identify databases that occur within each path in the network, and query the identified databases to obtain statistics for each path.

Topology-based monitoring (and storage) of statistics as described in the prior paragraph has several advantages. For example, statistics along a path can be displayed to a user, and the user can manually analyze the statistics to detect presence of and if present identify, sources of performance issues in the network (also called "bottlenecks"). In some embodiments, the statistics along a current path are analyzed automatically in a computer, to identify a component in the current path as a candidate for further investigation. The identified component may itself be a bottleneck e.g. if there are no other paths that intersect the current path. Alternatively the identified component may be itself a source of changes for another path that has a bottleneck or has another candidate for further investigation. In this manner, a bottleneck in the network as a whole can be automatically identified, and after identification the bottleneck is displayed to the user e.g. in association with a path experiencing a performance problem.

BRIEF DESCRIPTION OF THE FIGURES

FIG. 2C illustrates rules in a grammar used by the computer of FIG. 2A to generate the display illustrated in FIG. 2B.

FIG. 2D illustrates a legend for various abbreviations used in the display of FIG. 2B, and the meaning of the abbreviations.

FIG. 3A illustrates, in a flow chart, acts performed in some embodiments to implement operation 201 in FIG. 2A. FIGS. 3B-3F illustrate five paths that are parsed from a network in the distributed database management system of FIG. 1B by performance of the method of FIG. 3A.

FIG. 4A illustrates, in a flow chart, acts performed in some embodiments to implement operation 202 in FIG. 2A.

FIG. 4B illustrates statistics of three components A, B and C in a single path through a distributed database system.

FIG. 4C illustrates, in a legend, the symbols used in FIG. 4A to denote various states of each component in the distributed database management system.

FIGS. 6A-6G illustrate steps performed in one illustrative embodiment to implement the acts of FIG. 2A.

FIGS. 7A and 7B illustrate, in block diagrams, hardware and software portions of a computer that performs the method illustrated in FIG. 2A.

DETAILED DESCRIPTION

Figure 1A:
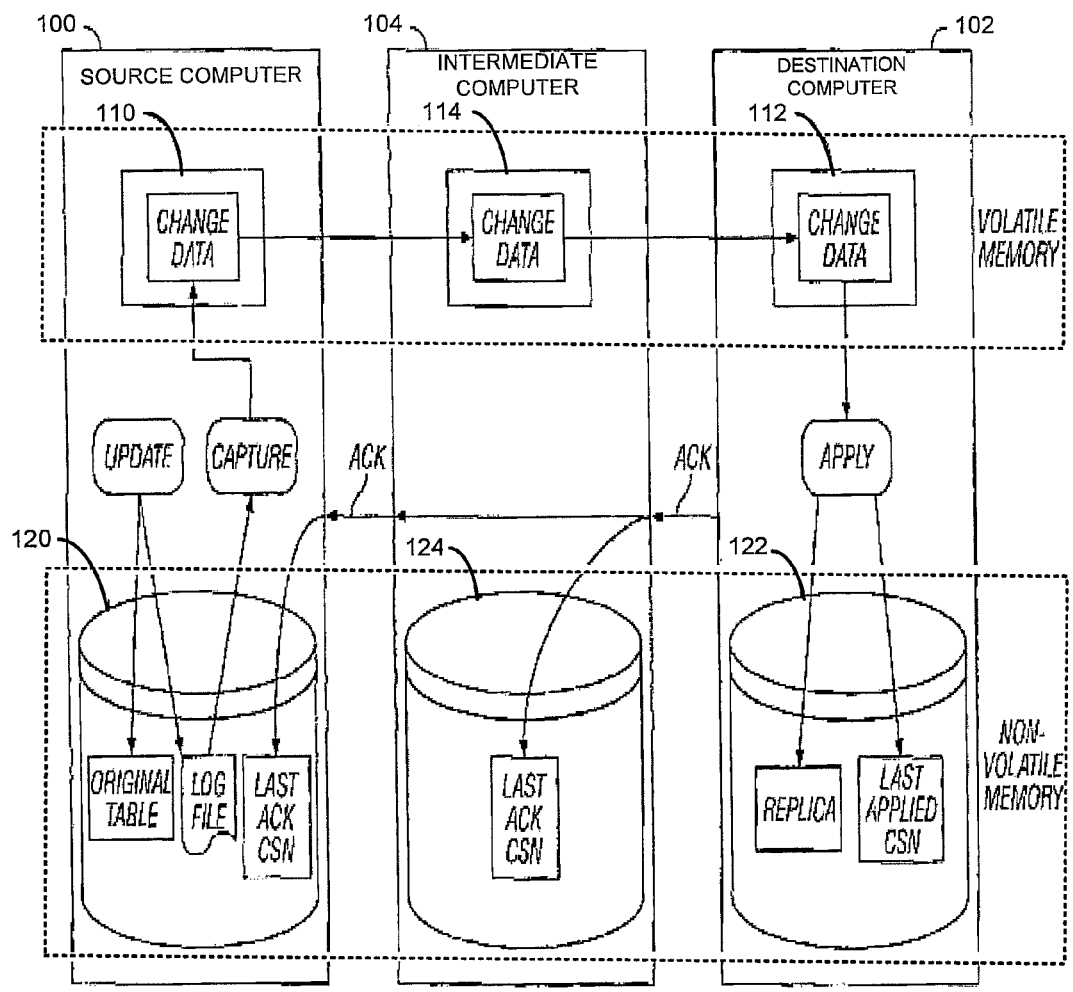
FIG. 1A illustrates, in a block diagram, one example of a distributed database management system of the prior art.

A computer is programmed, in accordance with the invention, to implement a relational database management system (RDBMS). The computer, when so programmed, supports replication of a DML or DDL change from a source database in the computer to a destination database in another computer by use of capture, propagate and apply components as described in U.S. patent application Ser. No. 11/604,529 entitled "Management Of A Distributed Database" filed on Nov. 27, 2006 and published as US Patent Publication 20080126354 which is hereby incorporated by reference herein in its entirety. Note that the current patent application has three inventors who are also named as inventors of the invention(s) in U.S. patent application Ser. No. 11/604,529. For more details on database replication, see the following document which is incorporated by reference herein in its entirety: Oracle® Streams Replication Administrator's Guide, 11g Release 1 (11.1), product B28322-02, published September 2007, by Oracle® Corporation of Redwood Shores, Calif., and this document is hereby incorporated by reference herein in its entirety.

A computer of the type described in the above paragraph is further programmed, in some embodiments, to provide an automated process 200 that traverses a network that interconnects source and destination databases, to identify paths (e.g. of streams) that start with components in source databases and end with components in destination databases as per operation 201. Note that a component in a database can be a collection of sub-components, each of which may contain smaller sub-components or individual processes. A tree-like hierarchy exists between a top-level component and multiple bottom-level processes. If a top-level component contains only one process, it is referred to as either component or process in the rest of this document. Note that in some embodiments, paths are identified at the component level. Moreover, in certain embodiments, process 200 obtains statistics at the process level for multiple components, in another operation 202. Note that depending on the embodiment, operations 201 and 202 can be performed in any sequence relative to one another. Also depending on the embodiment, operations 201 and 202 can be performed at levels other than those described below, e.g. operation 202 may be performed at a component level and/or operation 201 may be performed at a process level.

In network traversal operation 201 (FIG. 2A), some embodiments of the invention automatically split a complicated replication configuration of a distributed database system into a number of individual paths, each of which can be analyzed independently in operation 204 to identify sources of performance issues, as bottlenecks. For example, as data flows from process to process in the distributed database system, a pipeline like topology over multiple processes and intermediate resources is automatically discovered in operation 201. In certain configurations of the distributed database system, each path has a multi-component topology that starts from a starting process (e.g., Streams capture) and ends in a finishing process (e.g., Streams apply). Depending on the embodiment, the topology of paths through a distributed database system may be modeled by a directed acyclic graph (DAG) in a memory of the programmed computer, wherein components in databases are represented as nodes and links between components are represented as edges of the graph. The various components occurring in a path's topology through the distributed database system are generalized in certain embodiments, so that even the network's role in performance of the distributed database system can be analyzed.

Depending on the embodiment, statistics that are obtained in operation 202 are collected automatically at regular time intervals (e.g. every 10 seconds), simultaneously with multiple processes in the distributed database system communicating with one another across the network. For each time interval, various statistics such as latency, throughput, CPU consumption rate, network bandwidth, idle/flow_control rates and wait events, are collected for each individual process in the distributed database system.

Certain embodiments of the invention automatically classify in operation 202, all activities and/or wait times of each component into predetermined classes (such as busy, flow controlled and idle). In such embodiments, operation 202 calculates or otherwise obtains statistics related to the predetermined classes and required to perform analysis operation 204, such as idle time, busy time, and flow control time. Instead of, or in addition to, the just-described statistics, some embodiments of the programmed computer obtain various performance figures such as latency, throughput, CPU consumption rate, and network bandwidth, from each process and from the network to enhance performance understanding.

After statistics are obtained in operation 202 and after the paths have been identified in operation 201, process 200 analyzes the collected statistics, in an operation 203 to evaluate performance along each path, and to detect whether a component in the network adversely affects performance on the path and if so to mark the component as forming a bottleneck in the path. Process 200 also generates on a video monitor of the programmed computer, a path-specific display of statistics across the network in an operation 204. Specifically, given the statistics of each component in a path, in terms of the idle time, busy time, and flow control time, operation 203 of certain embodiments automatically identifies as a bottleneck, a component in each individual path if certain predetermined rules are satisfied. Some embodiments accept parameters specified by a user for use in the predetermined rules, to control bottleneck identification.

Performance of operation 202 by a programmed computer eliminates the time-consuming task of manually collecting performance data. Furthermore, performance of operation 203 by the programmed computer eliminates the need for a user to read through lengthy performance reports, and correlate or align data points over multiple processes and resource at the same time. The combination of operations 202 and 203 when programmed into a computer automates data collection and performance analysis in such a computer.

Between operations 203 and 204, certain embodiments perform an optional operation 205 to store the statistics to memory and/or store the statistics to the database, with or without an indication of a path to which the statistics pertain. In some embodiments, display operation 204 is performed after analysis operation 203, and results of performance of analysis operation 203 are included in the path-specific display on the computer monitor. In certain alternative embodiments, display operation 204 is performed instead of performance of analysis operation 203. In the just-described alternative embodiments, a user manually analyzes a path-specific display of statistics to find out why there is performance bottleneck in the path, and which processes are responsible for forming the bottleneck. Also depending on the embodiment, display operation 204 can be performed prior to analysis operation 203.

In some embodiments, the programmed computer performs an operation 205 to display statistics and/or bottleneck components in a path-based view, on a display device, such as a video monitor. Depending on the embodiment, the computer may display along each path, statistics collected for each process, component or resource, abstracted at one or more of three levels of granularity: an aggregated component level (e.g. the capture component), an aggregated sub-component level (e.g. the collection of all capture processes in the capture component), and an individual process level (e.g. a single capture process). Performance of operation 204 solves a problem of how to report or display a large amount of statistical data and analysis result(s) in a concise and easy-to-read format, which is critical for the user to manually discover potential problems and/or observe patterns in a topology in a timely manner. Note that operation 204 is performed repeatedly, once for each path between components.

Figure 1B:
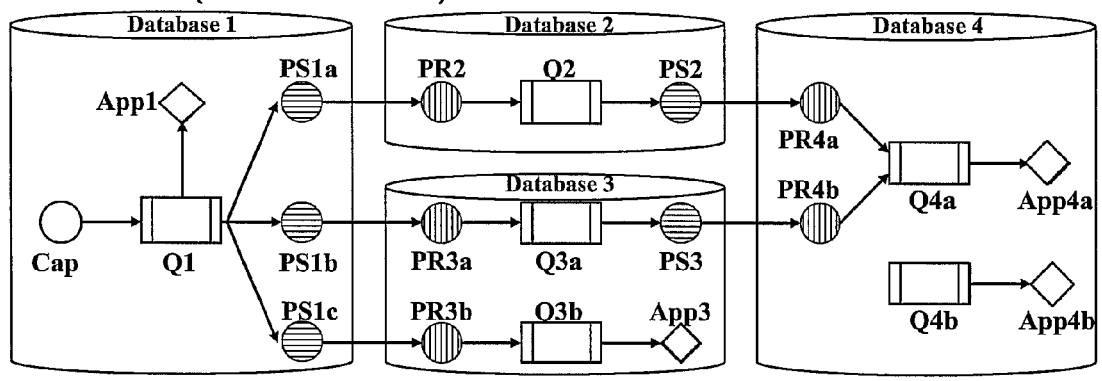
FIG. 1B illustrates, in a block diagram, another example of a distributed database management system of the prior art.
Figure 1C:
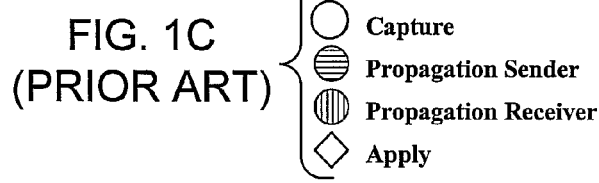
FIG. 1C illustrates, in a legend, the symbols used in FIG. 1B to denote various processes in the prior art distributed database management system.
Figure 2A:
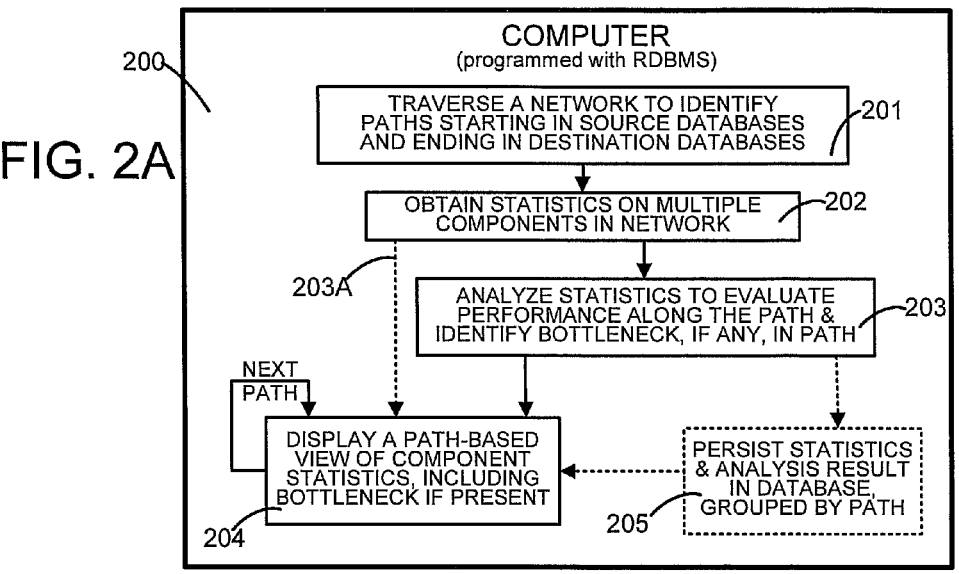
FIG. 2A illustrates, in a flow chart, acts performed by a programmed computer in several embodiments of the invention.
Figure 2B:
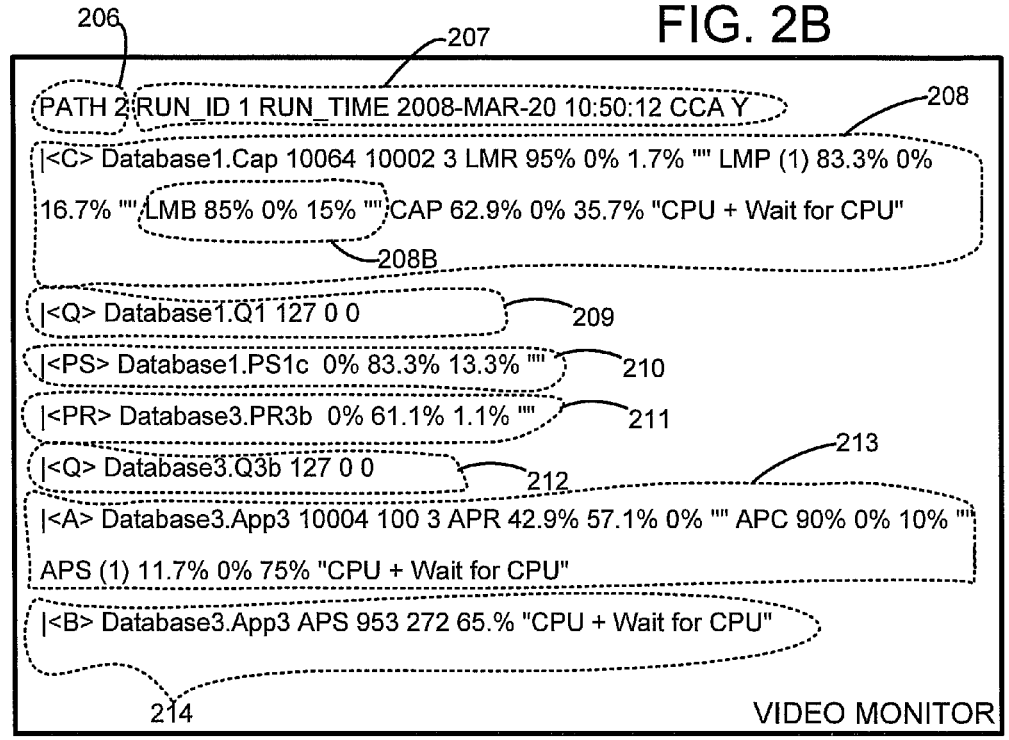
FIG. 2B illustrates the computer of FIG. 2A displaying on a video monitor, statistics along a path named "PATH 2", and a bottleneck therein, in accordance with the invention.

More specifically, FIG. 2B illustrates a display of statistics on a video monitor resulting from performance of operation 205, for the distributed database system shown in FIG. 1B, wherein PATH 2 was identified by performance of operation 201. Referring to FIG. 1B, note that PATH 2 starts at the Cap process in Database1, passes through Q1, PS1c, PR3b, Q3b and ends in process App3. Statistics of components/subcomponents in PATH 2 are displayed on a video monitor in a topology-based display as illustrated in FIG. 2B and described next. The statistics display in FIG. 2B includes an identifier 206 of the path for which statistics is being displayed, followed by information 207 which describes the manner and time at which the statistics was collected, i.e. metadata of the statistics. In information 207, "RUN_ID 1" shows that PATH 2 analyzed for the first time at "RUN_TIME 2008-MAR-20 10:50:12"; and "CCA Y" shows that the current analyzed path is configured with software called "CCA" turned on. The name "CCA" is an acronym for "Combined Capture and Apply." The software CCA is executed by a programmed computer to implement direct communication between a Capture component and multiple Apply components. For more information on CCA software, see U.S. patent application Ser. No. 11/831,478 filed Jul. 31, 2007 that is incorporated by reference herein in its entirety. Note that use of CCA software is not a critical aspect of several embodiments of the invention.

In the display of FIG. 2B, physically located adjacent to (e.g. immediately below) path identifier 206 and information 207 are a number of blocks 208-214 of statistics, each block corresponding to a component, or subcomponent within the path. A block for a component includes statistics on the component as a whole, and if appropriate further includes one or more sub-blocks of statistics on corresponding processes in the component. For example, blocks 209 and 212 (FIG. 2B) include statistics on queue Q1 of Database1 and queue Q3b of Database3 (FIG. 1B). As queues Q1 and Q3b are components that do not have any processes, they are not sub-divisible and hence there are no sub-blocks within blocks 209 and 212. Note that blocks 208-214 associated with a path identified in identifier 206 together form a statistical display 2001 (FIG. 2E) that may be followed by one or more lines of space to set this display apart from another statistics display 2002 for another path. A capture component in the Oracle® relational database management system (RDBMS) includes a number of processes, such as a preparer process (called LMP), a builder process (called LMB), a reader process (called LMR), and a capture-session process (called CAP). Accordingly, block 208 for the capture component includes several sub-blocks, such as sub-block 208B for the builder process. Similarly, block 213 for the apply component includes various sub-blocks (e.g. called "APR", "APC" and "APS").

Following statistics block 213 is an additional block 214 of information which results from operation 204 (FIG. 2A). Specifically, in the example illustrated in FIG. 2B, the apply component App3 in PATH 2 is found during operation 204 to be a bottleneck, and accordingly its name is listed in block 214. In addition to the component's name, also listed in block 214 are a subcomponent's name "APS", followed by a sessionid "953" and a serial# "272" of the user's session, a statistic "65. %" on a top event, with a description "CPU+ Wait for CPU" of the top event. A top event is a wait event in which a process spends most of its time during a given period of time. The statistics in block 213 (FIG. 2B) shows the process of APS spends 65% of its time in using CPU or waiting for CPU. The top event for a process varies depending on the task the process is performing. For example, if a process in an Oracle database management system is performing high-disk 10 read, its top event may possibly be 'db file sequential read'.

In some embodiments, a display of statistics is generated in accordance with a predetermined set of rules of a grammar of the type shown in FIG. 2C. In FIG. 2C, the statistics display for each path may include a block 220 for the capture component, followed by a block 215 for a queue, followed by an optional section 250. Section 250 if present has three blocks one for each of a sender process, a receiver process and another queue. A block 270 for the apply component follows section 250 if present or follows block 215 if section 250 is absent. Block 270 is followed by a block 293 for displaying a bottleneck (if any) in operation 204.

According to the rules shown in FIG. 2C, each block begins with a text string, and the text string itself includes the character "|" followed by a marker which identifies the block to the user. For example, block 220 begins with the text string 221 of value "|<C>" which notifies the user that this block of statistics is for the capture component. Note that blocks 270 and 293 have their respective text strings 271 and 294. Similarly, the queue block 215 has its text string 251 and the blocks for the sender and receiver processes in section 250 have their own text strings 256 and 265. Moreover, in each block of FIG. 2C, following the text string is a field for the name of the component within the distributed database system. For example, text strings 221, 271, 251, 256, 265 and 294 are respectively followed by the names 222, 272, 252, 257, 266 and 295. The component names which are used in a display of the type shown in FIG. 2B are abbreviated, as shown in FIG. 2D. Following the names, each block of statistics (i.e. except for results block 293) contains three or more statistics that are specific to the component named in that block. For example, in each statistic block, the names 222, 272, 252, 257, and 266 are respectively followed by a first statistic 223, 273, 253, 258 and 267, a second statistic 224, 274, 254, 259 and 268, and a third statistic 225, 275, 255, 260 and 269. The statistics blocks for the queue and the preceiver components have only three statistics 253-255 and 267-269 respectively, although other components may have more than three statistics. For example, the block for the psender component has six statistics 258-263.

Note that a given statistic, such as the second statistic, is deliberately chosen in some embodiments of the invention to be same or similar for certain components that are similar, to enhance user friendliness of the display. For example, the two components capture and apply are similar and their blocks 220 and 270 include similar first statistics 223 and 273 as the properties "msgs captured/sec" and "msgs applied/sec" respectively. Moreover, blocks 220 and 270 include the respective third statistics 224 and 275 are of the same property "latency".

To enhance user-friendliness of statistics display, the statistics on processes within a component are displayed hierarchically, as follows. Blocks 220 and 270 of the components capture and apply are displayed containing a number of sub-blocks for a corresponding number of processes within the respective blocks 220 and 270. For example, a block 220 for the capture component is displayed in FIG. 2B as containing embedded therein, a first sub-block 225-229 for the reader process "LMR", a second sub-block 230-234 and 234T for the preparer process, a third sub-block 235-238 and 238T for the builder process, a fourth sub-block 239-242 and 242T for the capture process, and a fifth sub-block 243-249 and 249T for the capture process session and propagation sender combined process.

In some embodiments of the invention of the type illustrated in FIGS. 2B and 2C, information within each sub-block is displayed in a sequence similar to a sequence of information displayed for a block. Similarity in sequence of information display, between blocks and sub-blocks, is deliberately chosen to enhance user friendliness of the display. In a first example, sub-block 225-229 starts with a name 225 of the process, followed by statistic 226 on the percentage of time this process is in the idle state, followed by statistic 227 on the percentage of time this process is in the flow controlled state, followed by statistic 228 on the percentage of time this process is performing a top event. In a second example, block 265-269 for the preceiver block has a name 266 (immediately following text string 265), followed by statistic 267 on the percentage of time this process is in the idle state, followed by statistic 268 on the percentage of time this process is in the flow controlled state, followed by statistic 269 on the percentage of time this process is performing a top event.

Note that statistics 226 and 267 are of the same property, namely the idle time, with statistic 226 being for a sub-block and statistic 267 being for a block. Similarly statistics 227 and 268 are also of the same property, namely the flow controlled time, again with the former statistic 227 being for a sub-block and the latter statistic 268 being for a block. Finally, statistics 228 and 269 are also of the same property, namely the top event time, again with the former statistic being for a sub-block and the latter statistic being for a block. Note that certain processes may have additional information that is displayed, e.g. the parallelism property 231 is displayed for the preparer process "LMP" in the sub-block 230-234, and 234T. Also note that several of the blocks and sub-blocks end with a statistic on a top event, followed by a description of the top event, such as 234 and 234T, 238 and 238T, 242 and 242T, 249 and 249T (which is an illustrative but not exhaustive list).

Hierarchical organization of statistical display (sub-blocks within a block) and similarity in the order in which statistics are displayed are both features of the display in FIG. 2B that are deliberately designed in some embodiments, to enhance the user's ease in reading data from a monitor that has a fixed size (i.e. fixed area). In certain embodiments, a computer is programmed to be responsive to a user's input to change the statistics being displayed, at different levels of granularity. For example, the user may request an aggregated display, and the computer responds by displaying statistics only at the block-level, and omitting from the display any statistics in sub-blocks.

Figure 2E:
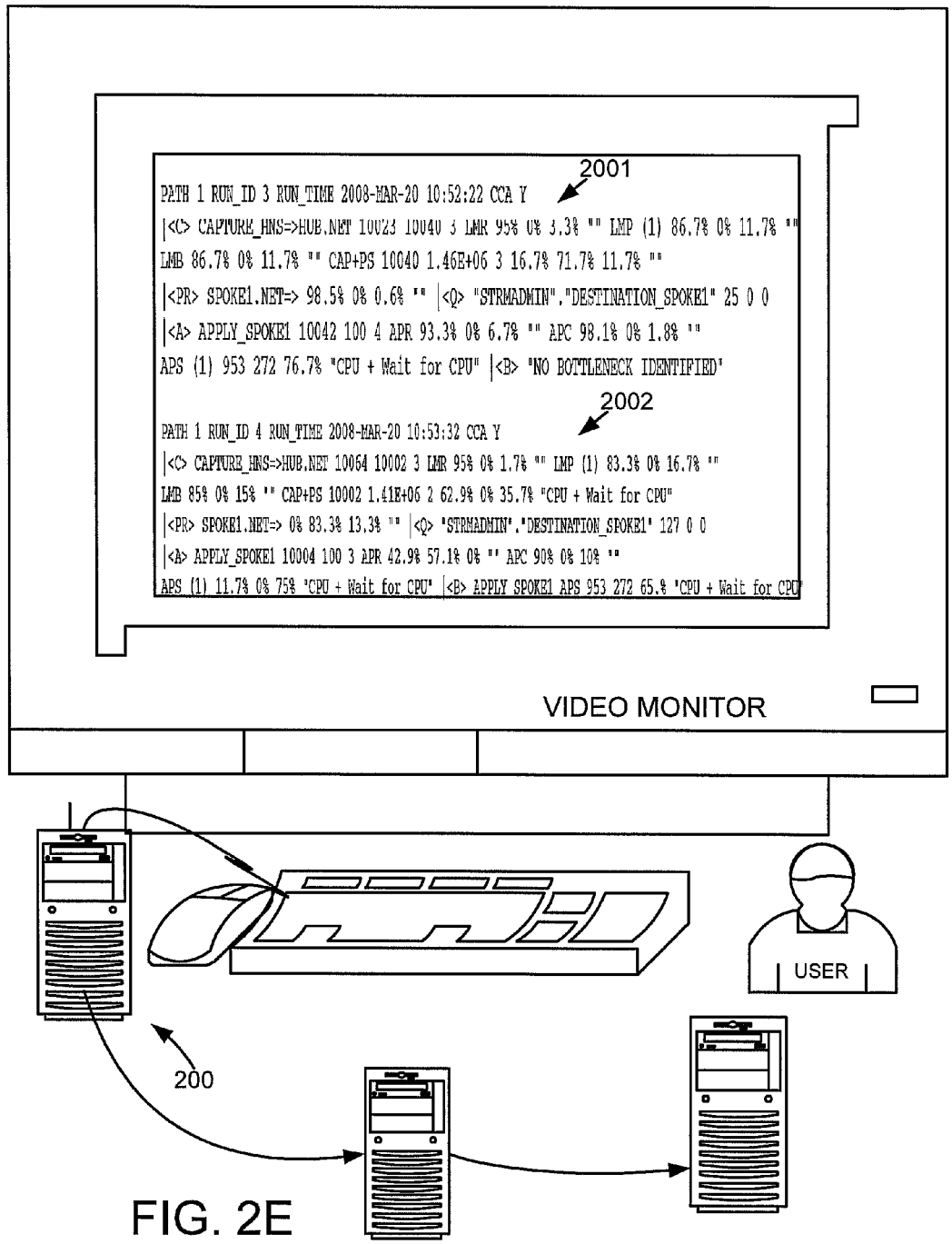
FIG. 2E illustrates, in a block diagram, hardware of the computer of FIG. 2A, including a video monitor with two sets of statistics displayed thereon, the statistics being collected at two different points in time from a distributed database management system, in accordance with the invention.

Also, note that a display of statistics as illustrated in FIG. 2B is repeated to display statistics for multiple runs of each individual path in a large distributed database system. For example FIG. 2E illustrates a video monitor of a computer which has the first display 2001 on the monitored statistics for the third run of a path and the second display 2002 on the monitored statistics for the fourth run of the same path. The just-described displays 2001 and 2002 are arranged in a time sequence, with display 2001 containing statistics collected prior to the statistics in display 2002. The displays 2001 and 2002 can be re-generated repeatedly as a function of time, to provide a scrolling display on the video monitor.

One advantage of a synthesized view of the type illustrated in FIG. 2E is an alignment of performance statistics in three dimensions. First, statistics are aligned along the topology in a pipelined fashion, one display for each path. Second, statistics are aligned with time flow. Third, statistics are aggregated at different levels of granularity. Hence, a display of the type shown in FIG. 2E on a video monitor of a fixed size, or on a page of a report, enables the user to quickly and easily examine performance statistics for one or more topologies for over a period of time at a preferred level of granularity. The synthesized view provides advisories to the user and helps pinpoint the bottleneck easily. For processes and resources working in a pipeline fashion, the above-described display of statistics supports topology management capabilities, and displays and integrates performance figures at varying levels of granularity at any given time, in a user-friendly manner.

Certain embodiments implement three levels of granularity as follows: (a) aggregated component level, which is illustrated by block 208 in FIG. 2B for the "capture" component; (b) aggregated sub-component level, which is illustrated by sub-block 208B in FIG. 2B for the "builder process" within capture; and (c) individual process level which is at an even lower level of granularity, not shown in the attached drawings. For example, given a top-level component (e.g., capture), it can have sub-components (e.g. LMR, LMP, LMB and CAP). Given a sub-component LMP with parallelism greater than 1, it can have more than one process. Depending on the embodiment, statistics may be shown for at the top-level component level, or at the sub-component level, or at the individual process level. Neither FIG. 2B nor FIG. 2C shows process-level statistics.

In some embodiments, the programmed computer performs operation 201 as illustrated in FIG. 3A. In some embodiments operation 201 is implemented at the database level, with iterations being performed for each database. Such embodiments are suitable for certain RDBMS which support only a single replication process in each database. For example, for Database4 in FIG. 1B, only one replication process is used, to implement both App4a and App4b in a single process.

In alternative embodiments, operation 201 is implemented at the level of a replication process, such as an apply component, with iterations being performed for each of multiple replication processes in the selected destination database. Hence, for Database4 in FIG. 1B, two iterations are performed in the alternative embodiments, one iteration for App4a and another iteration for App4b. Specifically, in act 301, the computer finds all destination databases and/or apply components in a distributed database system. Next, in act 302, the computer enters a loop of acts ("outer loop") over the destination databases and/or apply components found in act 301 as follows. The computer selects a destination database and/or apply component, followed by iteratively performing operation 310 to find all paths into the destination database and/or apply component. After operation 310 is completed, the computer checks, in act 308, whether all databases and/or apply components have been visited and if not returns to act 302 for another iteration. If all databases and/or apply components have been visited then the computer goes to act 309 to store in memory and/or to store to disk or other nonvolatile storage device, the results of repeated performance of operation 310, namely a plurality of paths that are to be individually analyzed in act 203.

As noted above, interconnection of databases and/or apply components is modeled by a directed acyclic graph, and the destination databases and/or apply components are found by traversing the graph to find all leaf nodes. The specific manner in which such a graph is traversed in operation 301 (FIG. 3A) is not a critical aspect of the invention, e.g. the graph may be traversed either in a depth-first manner or in a breadth-first manner depending on the embodiment. In the example illustrated in FIG. 1B, after performance of act 301, the computer identifies App1 in Database1, App3 in Database3, and App4a and App4b in Database 4.

Operation 310 can be implemented in any manner, and in some embodiments this operation is implemented by performance of acts 303-307. Specifically, in act 303 the computer finds all incoming communication links from source databases to a destination database and/or apply component that was selected in act 302, followed by entering another loop ("inner loop") over the incoming links. In act 304, the computer selects a link L, followed by an operation 311 to find a path P that includes link L. Operation 311 is implemented by acts 305 and 306 as discussed next. In act 305, the computer includes link L in path P. In act 306, the computer checks if any source database of link L itself has any incoming links and if so they are marked in memory for use in selection by act 304 during future iterations of the inner loop. If the computer finds that source database of link L has no incoming links, then the computer saves path P to memory and then proceeds to act 307. In act 307, the computer checks if all links to be visited in the inner loop have been selected, where all links includes links found by act 306 in prior iterations of the inner loop. If not, the computer returns to act 304; if yes, then the computer goes to act 308 (described above).

FIGS. 3B-3F illustrate five paths that are parsed from a network in the distributed database system of FIG. 1B by performing the method illustrated in FIG. 3A.

In some embodiments, a DAG (directed acyclic graph) input is received in operation 201 in FIG. 2A. The DAG input is obtained by the computer querying individual database views. In these embodiments, every database maintains two views, one for nodes (i.e., components) and the other for directed links between nodes (i.e., links between components). The node view contains information about each component, such as component name, component type (e.g., CAPTURE, QUEUE, PROPAGATION SENDER, PROPGATION RECEIVER and APPLY), component database, component property, component changed time and etc. The component name, component type and component database uniquely identifies each component. The directed link view contains information about the relationship between a source component and a destination component. The component name, component type and component database for source and destination components are also included for each directed link. Through local and remote queries, data from the above two views are combined together to build a graph in one database. The graph is stored in a temporary relational table. A simple depth-first search method is executed by the programmed computer to check whether the graph is a DAG. Note that if the programmed computer finds that the graph is not a DAG, then the topology analysis operation being performed terminates with an error message, e.g. stating that the graph received as input contains cycle(s).

Given the above-described DAG input retrieved from the temporary relational table, finding a set of components of a particular type (e.g., APPLY) is done by the computer executing an SQL SELECT statement with a condition on component type equal to the specified type in the SQL WHERE clause. Finding incoming links to a component is performed by the computer executing another SQL SELECT statement with a WHERE specifying the destination component.

In some embodiments, the programmed computer performs operation 202 as illustrated in FIG. 4A. In some embodiments operation 202 is implemented by finding all components in a distributed database system in act 401 followed by entering a loop of acts 402-406 over the components. The computer selects a component in act 402, followed by iteratively performing acts 403-406 to calculate statistics. Specifically, in acts 403, 404 and 405, the computer calculates the following process-level statistics for the selected component: idle time, busy time and flow control time. In act 406, the computer checks if all components have been visited in the current loop and if not returns to act 402.

If all components have been visited the computer proceeds to the next act, e.g. in an optional act 407 the computer stores to memory and/or stores to a disk or other nonvolatile storage device, the three process-level statistics that have been just computed, namely idle time, flow control time and busy time. Some embodiments of a programmed computer calculate the just-described three durations as a percentage of total time, e.g. idle time 25%, flow control time 25% and busy time 50%. Note that the three percentages add up to 100%. Hence, knowledge of two of the three percentages is sufficient to infer the third percentage (as the difference between 100% and the two known percentages). In such embodiments, only two percentages, e.g. idle time percentage and flow control time percentage are stored to memory and/or stored to disk or other nonvolatile storage device. If a component contains more than one process, the three statistics will be computed separately for each process.

The flow control time for a process in a source database is the time during which the process is waiting to transmit messages to another process which may be in an intermediate database or in a destination database, i.e. the other process is downstream. The idle time for a process is the time during which the process is waiting to receive messages from another process which may be in an intermediate database or in a source database, i.e. upstream. Moreover, time during which a process handles messages constitutes the busy time of the process. Accordingly, as illustrated in FIG. 4B, a process A in a path 410 has idle time 413A, busy time 412A and flow control time 411A. Similarly, process B in path 410 has idle time 413B, busy time 412B and flow control time 411B. Finally, process C in path 410 has idle time 413C, busy time 412C and its flow control time is zero (not shown in FIG. 4B). To summarize, a process of a distributed database system in some embodiments of the invention has two durations in which it waits for other processes: (1) an idle time in which it awaits receipt of a message to be processed and (2) a flow control time in which it awaits transmission of a message that has already been processed.

Measurement of duration of two types of wait states of a database process individually, namely measurement of time spent waiting for an upstream process and measurement of time spent waiting for a downstream process has heretofore not been done in any distributed database system known to the inventors of the current patent application.

The current inventors note that duration of overall waiting by a process is too coarse to be used in determining a bottleneck. In contrast, the duration of an idle state in which a process is waiting on an upstream process and the duration of a flow control state in which the process is waiting for a downstream process of can be used (either individually or together) to identify which one of several processes in a path forms a bottleneck, as discussed herein, e.g. in reference to FIG. 5A.

Calculating idle, flow control and busy in acts 403, 404 and 405 (FIG. 4A) requires access to a wait even monitoring facility. In the Oracle database management system, the active session history facility (ASH) provides continuous wait event monitoring over time. ASH monitors each process by sampling wait events at regular time intervals (e.g., 1 second). For a given period of time, a process's wait events are collected from ASH and then classified as busy wait and flow control wait. Note that ASH does not record idle wait events. Through local and remote database queries, ASH wait events are collected from multiple databases. For a given period, the busy time statistic is calculated as the ratio of the number of busy wait events to the total number of all wait events (including idle, busy, flow control); and the flow control time statistic is calculated as the ratio of the number of flow control wait events to the total number of all wait events (including idle, busy, flow control); the idle time statistic is obtained by subtracting the above two percentage statistics from 1.

Figure 5A:
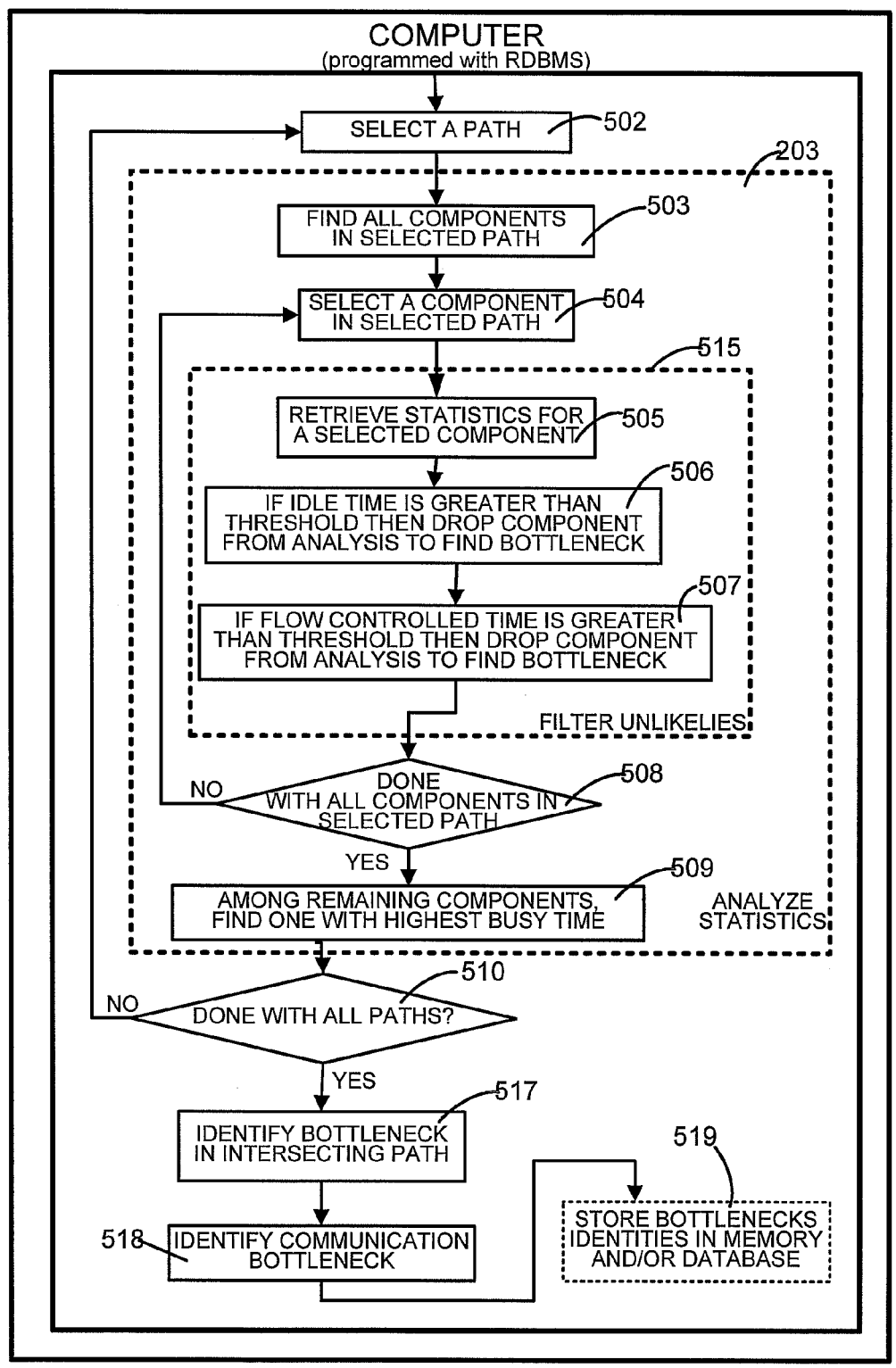
FIG. 5A illustrates, in a flow chart, acts performed in some embodiments to implement operation 203 in FIG. 2A.

In some embodiments, a programmed computer performs an analysis of performance of the distributed database based on idle time and flow control time statistics, as illustrated in FIG. 5A. Specifically, the computer iteratively performs operation 203 in a loop of acts ("outer loop"), once for each path among the plurality of paths in a distributed database system identified at the end of operation 201 (FIG. 2A). Accordingly, in act 502, the computer selects a path ("current path") from among the plurality of paths. Next, in act 503, the computer finds all components of the distributed database system that occur within the current path. Then, in an operation 515 that is repeatedly performed, once for each component in the current path, the computer filters out components unlikely to adversely affect performance, as discussed next. In some embodiments, the computer includes instructions that cause the computer to (a) apply a number of thresholds to statistics to identify multiple databases in a path for not causing a bottleneck and remove the multiple databases from a set to obtain a new subset, and (b) use the statistics to identify from the new subset, a specific database for having a process with a largest value of busy time, wherein the statistics comprise the busy time.

Specifically, in an act 505, the computer retrieves the statistics for the selected component, from memory and/or database (where statistics were stored as per act 407, as described above). Next, the computer applies one or more predetermined rule(s) to one or more statistics, and if a rule is satisfied, the component is dropped from further analysis. Specifically, in act 506 the computer checks if idle time is greater than a predetermined threshold and if so the component is dropped. Similarly, in act 507 the computer checks if flow controlled time is greater than another predetermined threshold and if so the component is dropped. Next, in act 508, the computer checks if any component in the current path has its statistics not yet checked against the predetermined thresholds, and if so returns to act 504.

When all components of a current path have been evaluated against the predetermined thresholds, the computer performs act 509. Specifically, in act 509 the computer finds from among the current path's components that remain i.e. not dropped from analysis, a specific component has the highest busy time. The just-described specific component with the highest busy time is, in some embodiments, designated as a bottleneck. Note that act 509 is implemented in certain embodiments such as by scanning a list of undropped candidates to find one with the maximum busy time, or by sorting the list of undropped candidates in descending order by busy time and then picking the first candidate in the sorted list. Note that if there are no undropped candidates on entering act 509, then no scanning or sorting is performed in the certain embodiments.

The computer then proceeds to act 510 to check whether or not all paths have been visited and if not returns to act 502. If all paths have been visited then the computer goes to act 517 to identify a bottleneck in intersecting paths and then the computer goes to act 518 to further address potential bottleneck issues. Then, the computer proceeds to the optional act 519 to store in memory and/or to store to disk or other non-volatile storage device, the identity of bottleneck found for each path. After analyzing bottleneck for all paths, the computer invokes operation 204 (FIG. 2A) to display statistics of each component along each individual path, including a bottleneck if identified. As a result of performing operation 204, the statistics are displayed on a computer's video monitor, as illustrated in FIG. 2B.

Figure 5B:
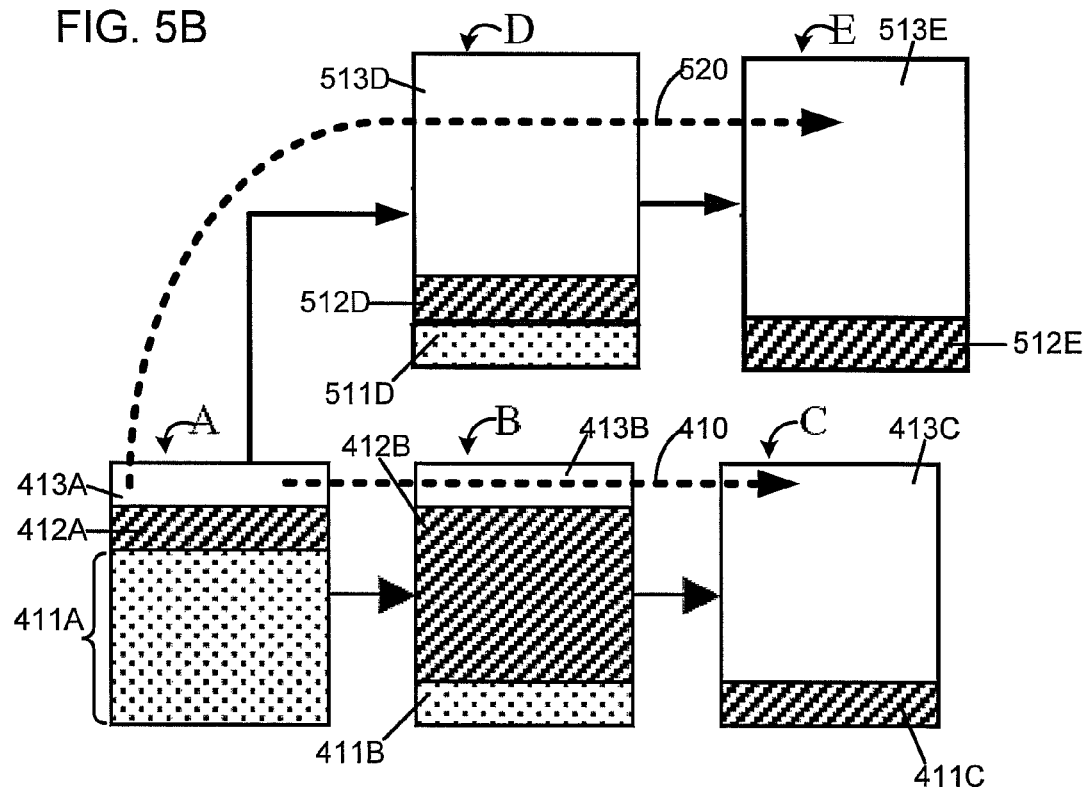
FIG. 5B illustrates statistics in a network with two paths, namely a first path (including components A, B and C) identical to the path in FIG. 4B and a second path (including components A, D and E) which intersects the first path (at component A).

If act 509 cannot identify bottleneck for some paths, the computer of some embodiments is programmed (1) to automatically check for a bottleneck in one or more paths that intersect those paths or (2) to automatically infer communication bottleneck between adjacent components in those paths. As illustrated in FIG. 5B and discussed next, act 517 and act 518 perform the above two acts respectively.

Specifically, a distributed database system of an illustrative example has five components A-E, with statistics of each component as illustrated in FIG. 5B. Assume that during analysis of the statistics of components A, D and E along path 520, no component remains available for analysis on entry into act 509 (FIG. 5A), e.g. if a threshold for idle time is set to 50% and a threshold for flow control time is set to 50%. Hence, there is no bottleneck identified for path 520 at the end of act 509, even though component A is significantly flow controlled (e.g., flow control time>50%).

In some embodiments, the computer checks if an idle component in a path (without bottleneck identified in act 509) receives messages on an incoming path from a component (also called "intersection" component) that also occurs in another path ("intersecting path"). If the result of checking is true, the computer further checks if the intersection component is itself flow controlled and if so, whether there is a component in the intersecting path that forms a bottleneck downstream to the intersection component. If so, then the bottleneck component with the maximum busy time statistic of all the intersecting paths is automatically identified by the computer in act 517, as affecting performance of the current path. FIG. 6F illustrates steps for implementing act 517.

In certain embodiments, the computer is further programmed to infer the existence of a communication bottleneck (e.g. network) in a path (without bottleneck identified in act 509 and act 517). In act 518, the computer examines all pairs of adjacent components in the path to locate an upstream pair where one component is significantly flow controlled (e.g., flow control time>50%) and its paired downstream component has a majority of its time spent in the idle state (e.g., idle time>50%). The computer infers that the communication link between these two component to be a potential bottleneck for the path. FIG. 6G illustrates steps for implementing act 518.

In the example illustrated in FIG. 5B, component A is an intersection component, and component B in path 410 forms a bottleneck that affects performance of path 520. After act 517, the computer automatically associates a bottleneck for path 410 with path 520. After the computer performs operation 204 wherein the bottleneck component of the intersecting path is displayed, a user who views such a display can allocate additional resources to component B, thereby to improve the performance of B. This in turn improves the performance of path 520.

In certain embodiments, the computer is programmed to use various structures to support various operations in FIG. 5A. For example, the computer uses a database table to keep components for each path. In this case, a SQL SELECT statement with a WHERE clause specifying the path identifier is used to perform act 503 in FIG. 5A. Similarly, a database table is used to keep an identified bottleneck component for each selected path. Depending on the embodiment other structures such as list can be used to maintain such information, instead of a database table.

The current inventors note that automatic identification of a bottleneck in an intersecting path for affecting performance of a current path and automatic inferring of communication bottleneck between adjacent components are believed to have heretofore not been done in any distributed database system known to the inventors of the current patent application.

In certain embodiments, the computer is further programmed to further analyze one or more components that have identified bottlenecks to make recommendations for improving the performance of each individual path. For example, if the communication link (e.g., network) between two adjacent components is a bottleneck, recommendations such as increasing network bandwidth or increasing TCP/IP buffer cache size are made for further improvements. As another example if the component CAPTURE is the bottleneck and its mainly on CPU then the programmed computer recommends that the user check if the rules are causing full evaluations. If it is the network that is determined to be the bottleneck, then the programmed computer recommends that the user set the TCP/SQLNet parameters appropriately. If the bottleneck is determined to be component APPLY waiting on contention then the programmed computer recommends that the user increase the values of certain parameters (e.g. inittrans or freelists in an Oracle database) on relevant tables.

In some embodiments, the computer is programmed to display to a user several different recommendations to improve the performance of a path. For example, assume two intersecting paths are both performing slowly due to an identified bottleneck component in one of the two paths. In this example, the computer of some embodiments is programmed to make two recommendations for improvement: (1) split the slower path from the relatively faster path by duplicating intersection component; or (2) allocate more resources to the bottleneck component on the slower path. The computer is further programmed to prioritize its improvement (i.e. enhancement) recommendations in such a way that the worst performing path is given the most-preferable improvement (also called "enhancement").

In some embodiments, the computer is programmed to automatically determine the worst performing path as a path selected from among multiple paths in a network for having the lowest throughput in processing database changes. The throughput is measured in some embodiments as the number of LCRs applied per second, wherein each LCR encapsulates a change in a source database that is propagated to a destination database. Note that an LCR is a generalized representation of a database change, while a change record (CR) is a database-specific representation of the change, e.g. specific to a particular destination database, such as the software product Oracle Database 11g Release 1 (also called 11gR1) which is available from Oracle Corporation.

In the above example, depending on the collected statistics about the two paths, the computer is programmed to give high priority to a recommendation for improvement (1) if the intersecting component is a capture component; or the computer may give high priority to recommendation (2) by suggesting to increase the parallelism if the intersecting component is an apply component.

A computer is programmed in some embodiments to implement the operations illustrated in FIG. 2A by performing various acts of the type illustrated in FIG. 6A, as discussed next. Specifically, in act 601, the computer receives a graph G wherein nodes represent databases of a distributed database system and edges represent links in a network that interconnects the databases. The computer performs acts 602-614 illustrated in FIG. 6A to discover stream paths in the graph G, with the understanding that graph G is a directed acyclic graph (DAG). As noted elsewhere herein, if graph G is not a DAG, the computer simply exits after displaying an error message.

Note that in graph G, each stream path connects a source database that is a source of logical change records (LCRs) to a destination database that is a destination for the LCRs. More specifically, a stream path begins in a database where a capture process, a synchronous capture, or an application generates messages and enqueues them in a source queue for transmission through a network. The messages can flow through a network in graph G via one or more propagations and queues in the stream path. The stream path ends in a destination database where the messages received through the network are dequeued from a destination queue by an apply process, a messaging client, or an application.

Figure 6A:
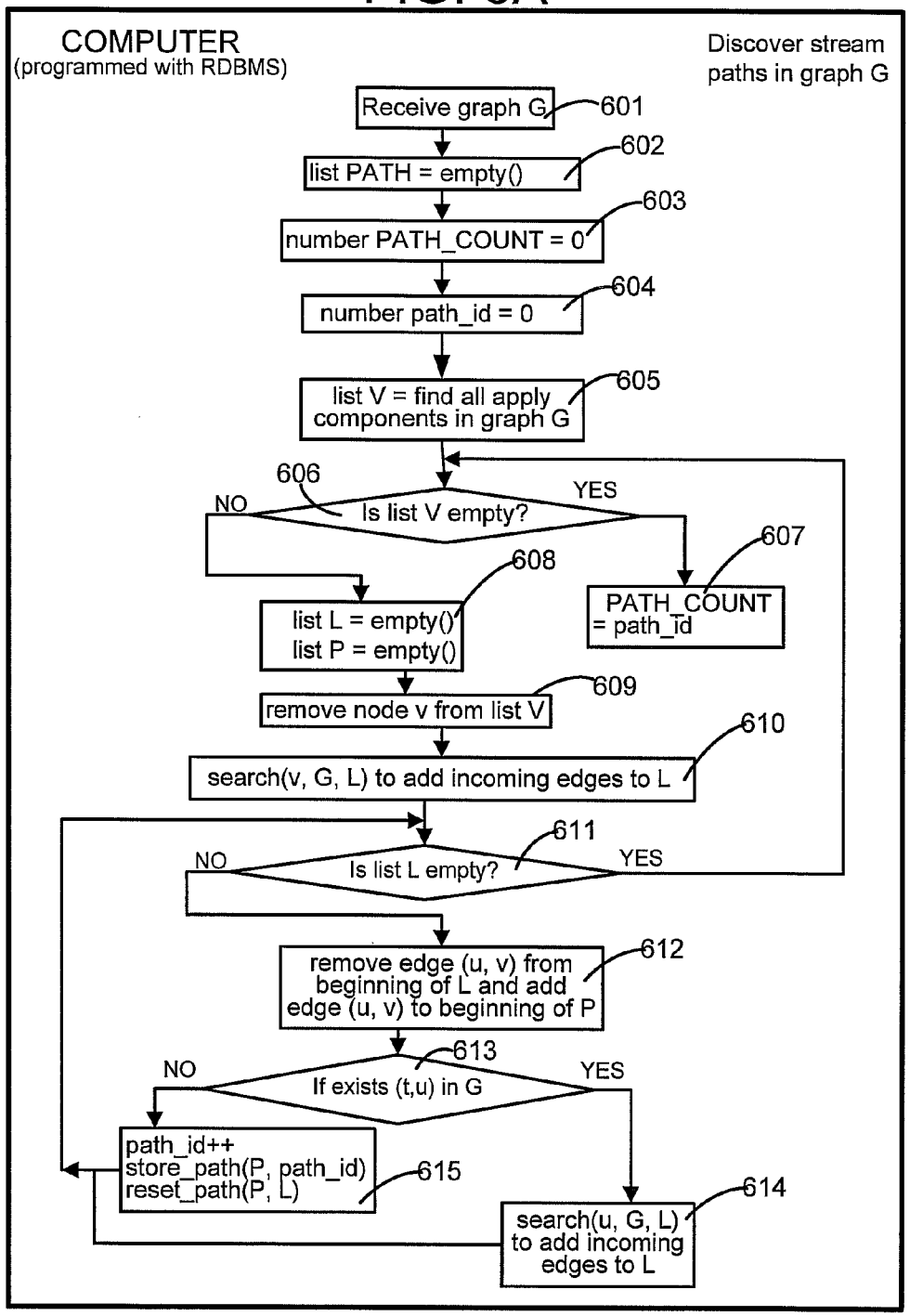

Referring to FIG. 6A, in acts 602-604, the computer initializes a data structure, such as a list, called PATH to empty, initializes an integer variable PATH_COUNT to zero, and initializes another integer variable path_id to zero. Next, in act 605, the computer initializes another structure, which may also be a list, called V to all components in graph G. Then, in act 606 the computer iterates over list V until list V is empty, as follows.

In act 608, lists P and L are set to empty. List P represents a list of stream paths and list L represents a list of edges. Next, in act 609, the computer removes a node v from list V, and goes to act 610. In act 610, the computer searches graph G for node v and adds the incoming edges of node v to list L. Then the computer loops over list L in act 611 as follows. In act 612, the computer removes an edge (u,v) from the beginning of the list L and adds edge (u,v) to the beginning of list P. Next, in act 613, the computer checks if any incoming edge (t,u) exists in graph G.

If the result of checking in act 613 is yes, the computer searches the graph G for node u and adds the incoming edges of node u to list L and then returns to act 611. If the result of checking in act 613 is no, the computer goes to act 615 and increments path_id by 1, and stores in path P the value of path_id, and resets the lists L and P and returns to act 611. In act 611 if the result of checking is yes, then the computer returns to act 606.

Figure 6B:
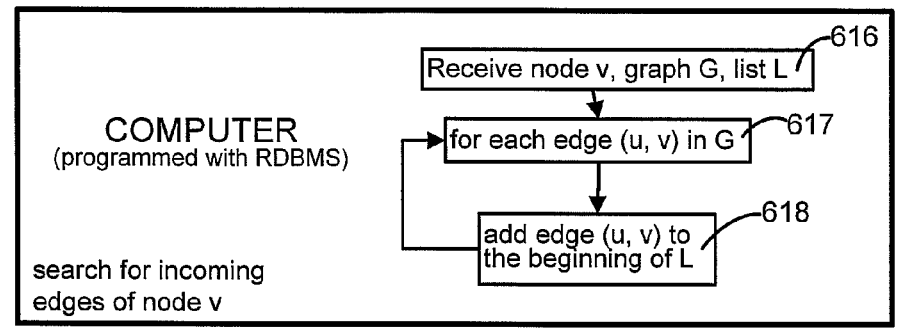

The above-described search function performed in acts 610 and 614 (FIG. 6A) is implemented in some embodiments by acts 616-618 as illustrated in FIG. 6B, and discussed next. Specifically, in act 616, the computer receives a node v, a graph G and a list L. Next, in act 617, the computer enters a loop for each edge (u,v) in graph G. Then in act 618, the computer adds edge (u,v) to the beginning of list L. Then the computer returns to act 617, until there are no more incoming edges for node v in graph G at which stage this search function is complete and control returns.

Figure 6C:
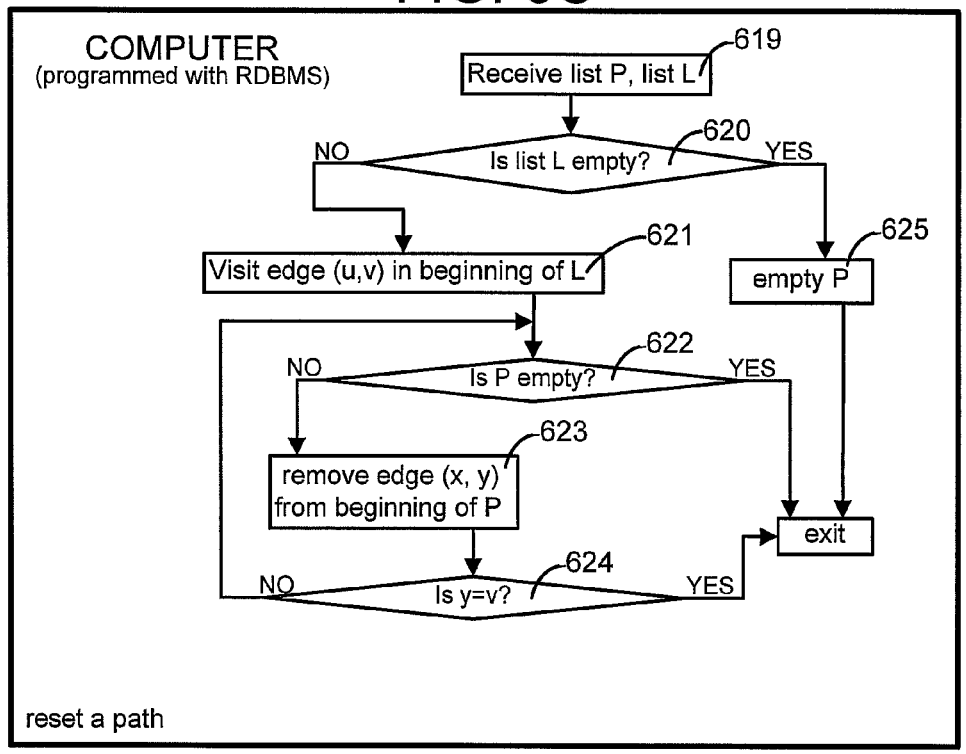

The above-described reset function performed in act 615 (FIG. 6A) is implemented in some embodiments by acts 619-625 as illustrated in FIG. 6C, and discussed next. Specifically, acts 619-625 are used to reset a path. In act 619, the computer receives a list P of stream paths and a list L of incoming edges of a node v. Next, in act 620, the computer checks if list L is empty. If list L is not empty, the computer goes from act 620 to act 621 to visit edge (u, v) which is at the beginning of list L. Next, the computer enters another loop until list P is empty. If list P is not empty, the computer goes to act 623 to remove edge (x, y) from the beginning of list P and then goes to act 624. In act 624, the computer checks if y is same as v and if not returns to act 622. If y is found to be same as v in act 624, the computer exits this function. The computer also exits this function if in act 622, the list P is empty. Moreover, if list L is empty in act 620, then the computer goes to act 625 where list P is emptied, and thereafter exits this function.

Figure 6D:
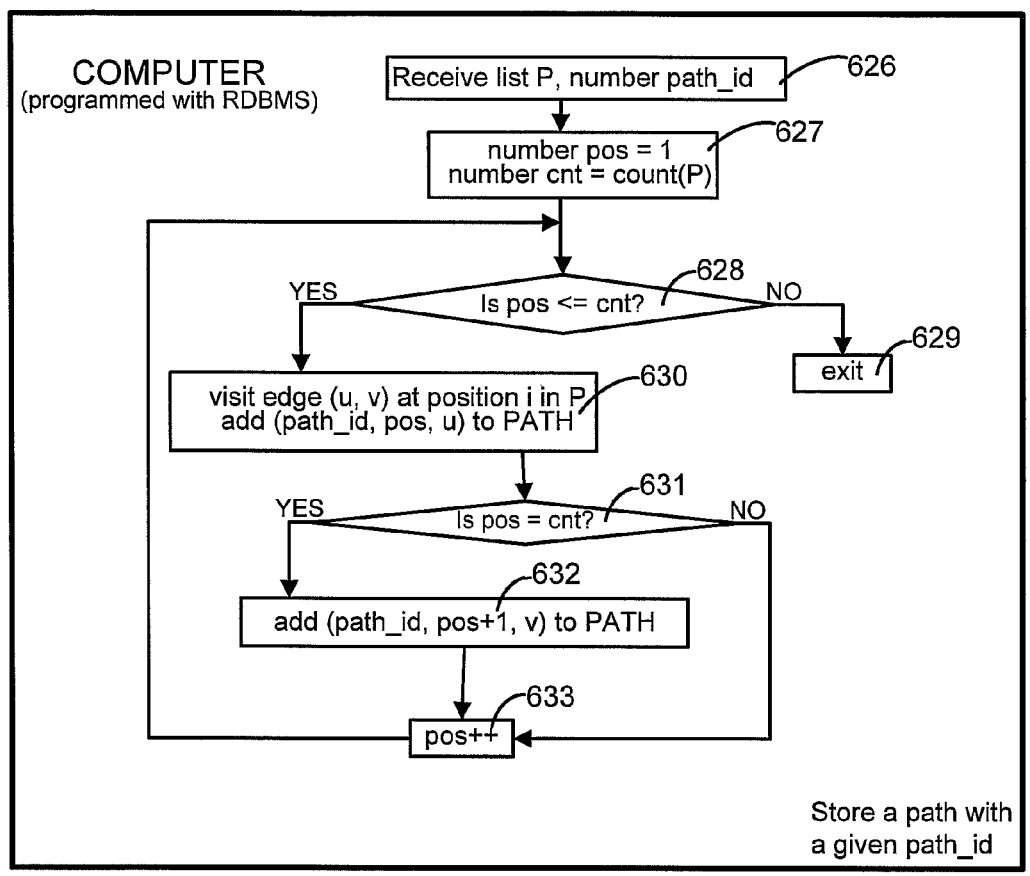

The above-described store_path function performed in act 615 (FIG. 6A) is implemented in some embodiments by acts 626-633 as illustrated in FIG. 6D, and discussed next. Specifically, acts 626-633 are used to store a path with a given path_id. In act 626, the computer receives a list P of stream paths and an integer variable holding the path_id. Next, in act 627, the computer sets another integer variable named pos to the value 1 and additionally sets yet another integer variable cnt to the number of stream paths in list P. Thereafter, the computer enters a loop while the variable pos is less than or equal to cnt. When this condition is met, the computer goes to act 630 to visit edge (u,v) at the position i in path P, and adds the path_id, pos and u to the variable PATH.

Next, in act 631, the computer checks if pos is same as cnt, and if so goes to act 632 to add the values of path_id, pos+1 and v to PATH. Then the computer goes to act 633 and increments pos, and then returns to act 628. If the result in act 621 is no, then too the computer goes to act 633 and increments pos and goes to act 628. In act 628 if the answer is no, then the computer exits this function in act 629.

Figure 6E:
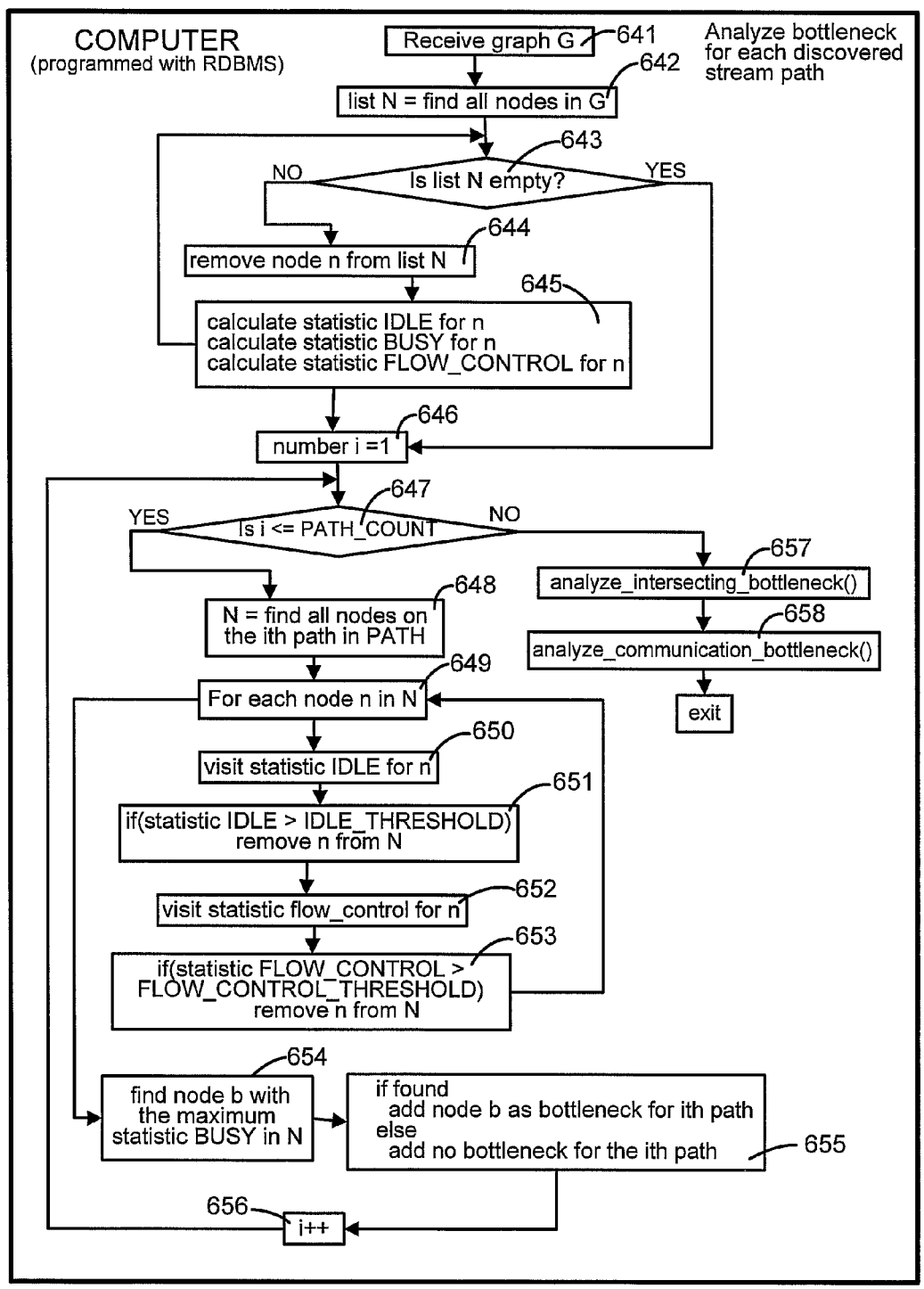
Figure 6F:
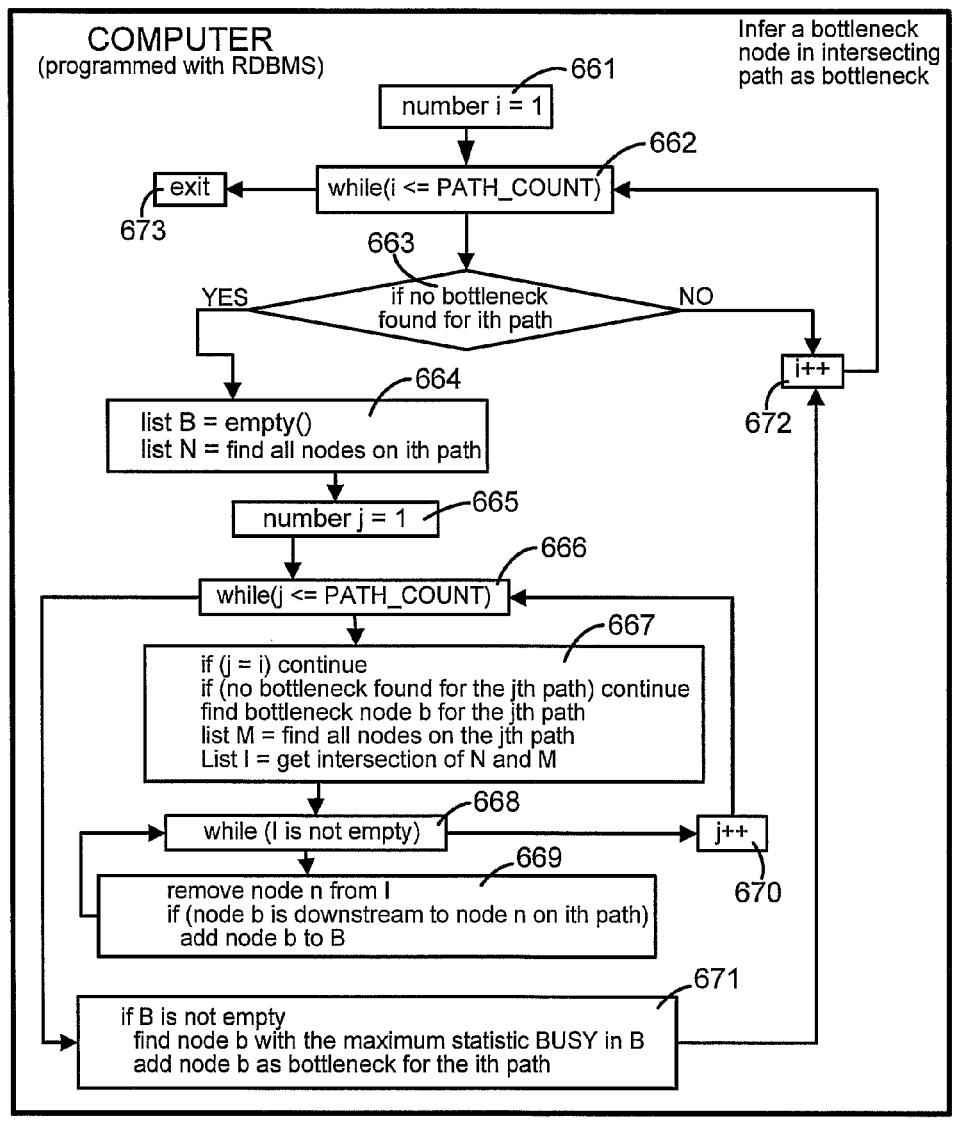

After performing the above-described topology discovery function as illustrated in FIG. 6A, the computer performs an analyze bottleneck function for each discovered stream path as illustrated by acts 641-658 in FIG. 6E. Note that the analyze bottleneck function in FIG. 6E uses two variables, namely (1) IDLE_THRESHOLD which is initialized to a user-defined value on the maximum amount of time for which a database is to be idle; and (2) FLOW_CONTROL_THRESHOLD which is initialized to a user-defined value on the maximum amount of time for which a database is to be in a flow control state.

Referring to FIG. 6E, in act 641, the computer receives a graph G. Next, in act 642, the computer sets a list N to all nodes in G. Then the computer enters a loop while the list N is not empty. Specifically, in act 644 the computer removes node n from list N, and goes to act 645. In act 645, the computer calculates three statistics for node n, namely the amount of time spent by node n in the following three states IDLE, BUSY, and FLOW_CONTROL. Next, the computer goes to act 646. Note that the computer also goes to act 646 if the answer in act 643 is that the list N is empty.

In act 646, the computer sets variable i (which is used as a counter for a loop on instructions) to 1 and then goes to act 647. Act 647 loops while i is less than or equal to the value PATH_COUNT as follows. Within the loop, the computer performs act 648 to find nodes qualified for bottleneck analysis. Specifically, the computer saves into list N all nodes on the ith path in PATH and then enters another loop in act 649. This loop is to perform acts 650-653 until all nodes n in the list N have been visited. Specifically, in act 650, the computer visits node n to obtain the statistic for the amount of time spent in IDLE state. Next, in act 651, the computer checks if the statistic for the time in IDLE state is greater than IDLE_THRESHOLD. If so, then the computer removes n from list N.

Regardless of the result of checking in act 651, the computer next goes to act 652 to visit node n to obtain a statistic on flow_control. Then, in act 653 the computer checks if the statistic FLOW_CONTROL is greater than FLOW_CONTROL_THRESHOLD. If so, then the computer removes n from list N and goes to act 649. Note that the computer also goes to act 649 if the statistic FLOW_CONTROL is found to be less than or equal to FLOW_CONTROL_THRESHOLD in act 653 but does so without removing n from N. The loop which is started in act 649 terminates after all nodes n in list N have been visited, subsequent to which the computer goes to act 654. In act 654 the computer finds the busiest node and marks it as a bottleneck.

Specifically, in act 654, the computer finds node b with the highest statistic BUSY in list N. Next in act 655, if the computer found the node b, then it adds node b as bottleneck for the ith path, and otherwise adds no bottleneck for the ith path. Then the computer goes to act 656 and increments i followed by returning to act 647. In act 647 if the counter i has exceeded PATH_COUNT, then the computer goes to act 657 to analyze intersecting bottlenecks followed by act 658 to analyze communication bottlenecks. Implementation of the just-described two analysis operations 657 and 658 are illustrated below in reference to FIG. 6F and FIG. 6G respectively.

In some embodiments, the computer is programmed to mark in its memory a node that is located within an intersecting path in graph G as bottleneck, by performing the method illustrated in FIG. 6F. Specifically, in act 661, the computer sets counter i to 1 and then goes to act 662. Act 662 loops while i is less than or equal to the value PATH_COUNT as follows. Within the loop, the computer performs act 663 to check if no bottleneck has been found for the ith path. If so, the computer goes to act 664 where it empties list B and initializes list N to all nodes on the ith path. Next, in act 665 the computer initializes another counter j to 1, and then goes into a loop in act 666 as follows. In act 666, the computer loops over operations 667-670 while counter j is less than or equal to PATH_COUNT.

In operation 667, the computer goes to end of operation 667 if counter j is of the same value as counter i. The computer also goes to the end of operation 667 if there is no bottleneck found for the jth path. Next, the computer finds a node b in the jth path that is a bottleneck. Then the computer initializes list M to all nodes on the jth path and also initializes list I to an intersection of lists N and M. Then the computer goes to operation 668 to loop while list I is not empty, over operation 669. In operation 669, the computer removes node n from list I. Then the computer checks if node b is downstream to node n on the ith path and is so, adds node b to list B and returns to operation 668.

In operation 668 if the list I is empty, the computer goes to act 670 where it increments counter j and then returns to act 666. In act 666 if the counter j is greater than PATH_COUNT, then the computer performs operation 671. In operation 671, the computer checks if list B is not empty and if true then the computer finds node b which has a maximum statistic BUSY in list B, and adds node b as bottleneck for the ith path. On completion of operation 671, the computer goes to act 672 to increment counter I and then returns to act 662. In act 662 if the counter i is greater than PATH_COUNT, the computer exits this function in act 673.

In some embodiments, the computer is programmed to mark in its memory a link (also called communication link) that is located within graph G between two adjacent nodes as bottleneck, by performing the method illustrated in FIG. 6G. Specifically, in act 681, the computer sets counter i to 1 and then goes to act 682. Act 682 loops while i is less than or equal to the value PATH_COUNT as follows. Within the loop, the computer performs act 683 to check if no bottleneck has been found for the ith path. If so, the computer goes to act 684 where it initializes list N to all nodes on the ith path. On completion of act 684, note that in list N, the nodes are ordered by their positions relative to one another along the ith path. Next, in act 685 the computer initializes another counter j to 1, and then goes into a loop in act 686 as follows. In act 686, the computer loops over operations 687-690 while counter j is less than or equal to length of list N.

In operation 687, the computer visits node x at position j in the list N and obtains a statistic on the amount of time spent in the FLOW_CONTROL state for node x. Next, the computer checks in act 688 whether this statistic on FLOW_CONTROL time is greater than the FLOW_CONTROL_THRESHOLD. If so, then the computer performs operation 689. In operation 689, the computer visits node y at position j+1 in list N, and obtains a statistic on the amount of time spent in the IDLE state for node y. Next, the computer checks whether this statistic on IDLE time is greater than the IDLE_THRESHOLD. If so, then the computer adds a link between nodes x and y as a bottleneck for the ith path and breaks out of the loop started in act 686. If not, then the computer goes to act 690 where it increments the counter j and returns to act 686. If in act 686 the counter j reaches the length of list N, then the computer goes to act 691 to increment counter i and returns to act 682. Note that the computer also goes to act 691 from act 683 if the check finds a bottleneck in the ith path. In act 682 if the counter i is greater than PATH_COUNT, the computer exits this function in act 692.

In certain embodiments, the computer is programmed to distribute its recommendations on enhancements (i.e. improvements) to different paths as follows. For each path P identified with a bottleneck, the computer performs the following steps. The computer chooses bottleneck component C. Then the computer checks if path P has a communication link as bottleneck, and if so resets C to be downstream component of the communication link.

Next, the computer finds a value of the maximum Busy Rate maxBR for path P. Then the computer checks if (Busy Rate BR of component C is less than maxBR). If the result of this check is yes, the computer sets Throughput_Improvement=(1.0−maxBR)/maxBR but if the result is no then sets Throughput_Improvement=(1.0−BR)/maxB.

Next, the computer checks if path P has a communication link as bottleneck. If the result of this check is yes, the computer increases network bandwidth Throughput_Improvement for the bottleneck communication link but if the result is no, then the computer increase CPU resource for the bottleneck component The method of FIG. 2A may be used to program a computer system 1000 of the type illustrated in FIG. 7A which is discussed next. Specifically, computer system 200 includes a bus 1102 (FIG. 7A) or other communication mechanism for communicating information, and a processor 1105 coupled with bus 1102 for processing information. Computer system 200 also includes a main memory 1106, such as a random access memory (RAM) or other dynamic storage device, coupled to bus 1102 for storing information and instructions (e.g. for the method of FIG. 2A) to be executed by processor 1105.

Main memory 1106 also may be used for storing temporary variables or other intermediate information (e.g. statistics shown in FIG. 2B and/or paths shown in FIGS. 3B-3E) during execution of instructions to be executed by processor 1105. Computer system 200 further includes a read only memory (ROM) 1104 or other static storage device coupled to bus 1102 for storing static information and instructions for processor 1105. A storage device 1110, such as a magnetic disk or optical disk, is provided and coupled to bus 1102 for storing information and instructions.

Computer system 200 may be coupled via bus 1102 to a display device or video monitor 1112 such as a cathode ray tube (CRT) or a liquid crystal display (LCD), for displaying information to a computer user. An input device 1114, including alphanumeric and other keys (e.g. of a keyboard), is coupled to bus 1102 for communicating information and command selections to processor 1105. Another type of user input device is cursor control 1116, such as a mouse, a trackball, or cursor direction keys for communicating direction information and command selections to processor 1105 and for controlling cursor movement on display 1112. This input device typically has two degrees of freedom in two axes, a first axis (e.g., x) and a second axis (e.g., y), that allows the device to specify positions in a plane.

As described elsewhere herein, collecting and analyzing statistics of components in a distributed database system is performed by computer system 200 in response to processor 1105 executing one or more sequences of one or more instructions contained in main memory 1106. Such instructions may be read into main memory 1106 from another computer-readable storage medium, such as storage device 1110. Execution of the sequences of instructions contained in main memory 1106 causes processor 1105 to perform the operations of a process described herein and illustrated in FIG. 2A. In alternative embodiments, hard-wired circuitry may be used in place of or in combination with software instructions to implement the invention. Thus, embodiments of the invention are not limited to any specific combination of hardware circuitry and software.

The term "computer-readable storage medium" as used herein refers to any storage medium that participates in providing instructions to processor 1105 for execution. Such a storage medium may take many forms, including but not limited to (1) non-volatile storage media, and (2) volatile storage media. Common forms of non-volatile storage media include, for example, a floppy disk, a flexible disk, hard disk, optical disk, magnetic disk, magnetic tape, or any other magnetic medium, a CD-ROM, any other optical medium, punch cards, paper tape, any other physical medium with patterns of holes, a PROM, and EPROM, a FLASH-EPROM, any other memory chip or cartridge that can be used as storage device 1110. Volatile storage media includes dynamic memory, such as main memory 1106 which may be implemented in the form of a random access memory or RAM.

Instead of or in addition to a storage medium, transmission link may be used to provide instructions to processor 1105. A transmission link includes coaxial cables, copper wire and fiber optics, including the wires that comprise bus 1102. A transmission link can also take the form of acoustic or light waves, such as those generated during radio-wave and infrared data communications, any of which can be used to implement a carrier wave as described herein.

Accordingly, instructions to processor 1105 can be provided by a transmission link or by a storage medium from which a computer can read information, such as data and/or code. Specifically, various forms of transmission link and/or storage medium may be involved in providing one or more sequences of one or more instructions to processor 1105 for execution. For example, the instructions may initially be comprised in a storage device, such as a magnetic disk, of a remote computer. The remote computer can load the instructions into its dynamic memory (RAM) and send the instructions over a telephone line using a modem.

A modem local to computer system 200 can receive the information on the telephone line and use an infra-red transmitter to transmit the information in an infra-red signal. An infra-red detector can receive the information carried in the infra-red signal and appropriate circuitry can place the information on bus 1102. Bus 1102 carries the information to main memory 1106, from which processor 1105 retrieves and executes the instructions. The instructions received by main memory 1106 may optionally be stored on storage device 1110 either before or after execution by processor 1105.

Computer system 200 also includes a communication interface 1115 coupled to bus 1102. Communication interface 1115 provides a two-way data communication coupling to a network link 1120 that is connected to a local network 1122. Local network 1122 may interconnect multiple computers (as described above). For example, communication interface 1115 may be an integrated services digital network (ISDN) card or a modem to provide a data communication connection to a corresponding type of telephone line. As another example, communication interface 1115 may be a local area network (LAN) card to provide a data communication connection to a compatible LAN. Wireless links may also be implemented. In any such implementation, communication interface 1115 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1125 or to data equipment operated by an Internet Service Provider (ISP) 1126. ISP 1126 in turn provides data communication services through the world wide packet data communication network 1124 now commonly referred to as the "Internet". Local network 1122 and network 1124 both use electrical, electromagnetic or optical signals that carry digital data streams. The signals through the various networks and the signals on network link 1120 and through communication interface 1115, which carry the digital data to and from computer system 200, are exemplary forms of carrier waves transporting the information.

Computer system 200 can send messages and receive data, including program code, through the network(s), network link 1120 and communication interface 1115. In the Internet example, a server 1100 might transmit statistics of components in a distributed database system through Internet 1124, ISP 1126, local network 1122 and communication interface 1115.

The instructions for performing the operations of FIG. 2A may be executed by processor 1105 as they are received, and/or stored in storage device 1110, or other non-volatile storage for later execution. In this manner, computer system 200 may obtain the just-described instructions and any related data in the form of a carrier wave.

Note that FIG. 7A is a very low-level representation of many hardware components of a computer system. Several embodiments have one or more additional software components in main memory 1106 as shown in FIG. 7B. Specifically, in such embodiments, computer system 200 of FIG. 7A implements a distributed database management system 1905 of the type illustrated in FIG. 7B. Distributed database management system 1905 manages a distributed database system 110 that includes multiple databases (e.g. 120a-120n), each database being stored on different storage mechanisms.

In some embodiments, the multiple databases are made to appear to an application 1904 as a single database. In such embodiments, an application 1904 can simultaneously access and modify the data in several databases 120a-120n via a network that interconnects them. In other embodiments, an application 1904 interacts with only one database, e.g. database 120a and any changes in database 120a are automatically propagated via streams to one or more other databases, such as database 120b. Streams are further described in the document entitled Oracle® Streams Concepts and Administration, 11 g Release 1 (11.1), Part Number B28321-02, September 2007 which is incorporated by reference herein in its entirety. In particular, see Part IV, which includes Chapters 23-31 in the just-described document.

In some embodiments, a database 120a (FIG. 7B) is a source of database changes in the form of LCRs that are propagated via a stream through a path in the network to another database 120b which is a destination database. As illustrated in FIGS. 4B and 5B and discussed above, such a path may pass through one or more databases. Distributed database management system 1904 is configured in some embodiments to obtain information associated with individual databases 120a-120n of distributed database system 110.

Distributed database management system 1904 analyzes the information received from databases 120a-120n, and provides the result(s) of the analysis as an output (for example through a graphical user interface) displayed on a video monitor to a user. In some embodiments, the distributed database management system 1904 aggregates database statistics from the plurality of databases 120a-120n. The distributed database management system 1904 then analyzes the aggregated statistics to identify performance and/or configuration issue(s), if any.

Each database 120a-120n in distributed database system 110 is controlled by a local database management server (DBMS) which cooperates with other such DBMS to maintain overall consistency of data stored by distributed database system 110. In several embodiments, the local DBMS is responsive to commands (also called queries) from application 1904 and/or distributed database management system 1905, in conformance with a relational database language, the most common of which is the Structured Query Language (SQL). The commands are used by application 1904 of some embodiments to store, modify and retrieve data in the form of rows in tables in distributed database system 110. The tables have one or more columns and zero or more rows as in a relational database that stores data in the form of tables related to one another.

Distributed database management system 1905 of some embodiments includes an input logic 130, an analysis logic 140 and an output logic 150 of the type described in U.S. application Ser. No. 11/604,529 that has been incorporated by reference above. Specifically, distributed database system 1905 includes an input logic 130 that is used to perform operations 201 and 202 (FIG. 2A) to obtain statistics associated with various components in distributed database system 110. In one embodiment, the input logic 130 gathers information from each of databases 120a-120n of distributed database system 110.

For example, input logic 130 queries databases 120a-120n periodically (e.g., every five minutes) and/or on-demand (e.g., in response to a request to perform analysis from a user). In another example, databases 120a-120n move data via export/import (e.g., periodically) to input logic 130. In yet another example, input logic 130 receives information from a user manually by populating data provided by statistics-gathering software associated with one or more of databases 120a-120n.

The distributed database management system 1905 further includes an analysis logic 140 configured to perform operation 203 (FIG. 2A). In some embodiments, analysis logic 140 analyzes the information received from distributed database system 110 to evaluate performance of each path through a network used to implement distributed database 110. In one example, analysis logic 140 determines throughput (e.g., number of logical change records per second) and latency. Latency is a measure of how far behind destination database 120n is from source database 120a (e.g. in terms of the number of logical change records).

Analysis logic 140 of some embodiments also identifies individual component(s) in distributed database system 110 that negatively impact performance of distributed database system 110, as bottleneck(s). Analysis logic 140 further provides recommendation(s) and/or enhancements to reduce such negative impact and/or eliminate the identified bottleneck(s) (e.g., configuration of the distributed database system 110 and/or individual database(s) 120a-120n). Thus, analysis logic 140 identifies configuration issue(s), performance issue(s) and/or runtime error(s) and, optionally, identifies enhancements. For example, the analysis logic 140 performs analysis of statistics on various components with respect to configuration of the distributed database 110 (e.g., topology) as discussed above.

Distributed database management system 1905 further includes an output logic 150 that performs operation 204 to provide information regarding performance of distributed database system 110. In one embodiment, at least a portion of performance information is made available to a user by a graphical user interface that generates a display on a video monitor. In one example, output logic 150 provides analysis results via a web-based user interface that depicts a topology of the distributed database system 110 (e.g., on a display screen) and marks thereon any of database(s) 120a-120n and/or links therebetween that have been identified as bottleneck(s). Additionally and/or alternatively, a database-centric screen is responsive to a command in a command-line interface and displays on a video monitor text information on incoming and/or outgoing flows of data from a particular database 120a. Another screen identifies streams of data that are used to monitor performance and/or overall system health as well as identify performance bottlenecks.

In one example, output logic 150 includes application program interface(s) (APIs) that publish the results (e.g., via database views). Also, APIs are provided by the distributed data base management system 1905 to trigger information gathering of input logic 130 and/or analysis by analysis logic 140. In another example, for file-based users, output logic 150 generates a text-based analysis summary as noted above.

Note that the local DBMSs of each of databases 120a-120n transmit data between each other through a network of links therebetween using various data transport mechanisms ("transport mechanisms"). The transport mechanisms of some embodiments include Database Server to Database Server file transport mechanism and a rule-based messaging system of the type described in US Patent Publication 20050038831 that is incorporated by reference herein in its entirety. Also, distributed database system 110 of some embodiments is implemented as described in US Patent Publication 20040034640 that is incorporated by reference herein in its entirety.

Numerous modifications and adaptations of the embodiments described herein will become apparent to the skilled artisan in view of this disclosure.

For example, although several embodiments perform act 203 (FIG. 2A) to analyze statistics to identify bottlenecks, certain alternative embodiments are implemented without bottleneck identification. In the just-described alternative embodiments, control passes from operation 202 directly to operation 204 via branch 203A as shown in FIG. 2A. Accordingly, the user views a display of the statistics along each path. The statistics may be used to manually identify bottlenecks and/or add capacity to relieve the bottleneck(s).

Also, a bottleneck detection method for a tree-based topology is implemented in certain embodiments of the invention as follows: a computer is programmed to determine at each node whether there is a bottleneck downstream of the node and which of the children nodes in the tree is contributing to the bottleneck. The first node starting from the root which is determined by the computer to not have a bottleneck downstream is automatically marked as a bottleneck for the tree. The child node which is looked at in each step of this method is the least idle child, after that the computer uses the bottleneck analysis as described above. The following pseudo-code illustrates this method: (1) set node=root; (2) set child=least idle child of node; (3)(a) Is the bottleneck the node? YES: return node as bottleneck; (3)(b) Is the bottleneck the connection between the node and the child? YES: return connection as bottleneck; (3) (c) set node=child, goto step (2). Note that in step (3)(c) of this method, the bottleneck is known to be the child or its descendants.

Numerous modifications and adaptations of the embodiments described herein are encompassed by the scope of the invention.

What is claimed is:

1. A non-transitory computer-readable storage medium comprising a plurality of instructions to cause a computer to:
    automatically traverse a network interconnecting a set of relational databases in a distributed database system, to identify a plurality of paths, at least a path in said plurality of paths starting in a source database in said set and ending in a destination database in said set, each relational database in the set being controlled by a local database management server (DBMS) cooperating with at least another DBMS to maintain overall consistency of data stored by said distributed database system, each DBMS being responsive to queries in a relational database language, each relational database in said set comprising data accessible via said queries as rows in tables related to one another;
    automatically obtain a group of statistics on performance of a plurality of components in said distributed database system by querying at least said source database and said destination database;
    wherein said plurality of components comprises at least a first database process of said source database, a second database process of said destination database, and said path between said source database and said destination database; and
    automatically generate at least one display comprising an identifier of said path and physically adjacent thereto statistics in said group associated with said path.

2. The non-transitory computer-readable storage medium of claim 1 wherein:
    said statistics in said group comprise at least a first duration of time during which a relational database in said set is awaiting receipt of a first message; and
    said statistics in said group further comprise at least a second duration of time during which said relational database is awaiting transmission of a second message.

3. The non-transitory computer-readable storage medium of claim 1 further comprising instructions to cause said computer to:
    apply predetermined rules to said statistics to identify a database process in said path as a bottleneck in said path.

4. The non-transitory computer-readable storage medium of claim 1, further comprising instructions to cause said computer to:
    apply a predetermined rule to said statistics to identify as a bottleneck, a database in another path.

5. A non-transitory computer-readable storage medium comprising a plurality of instructions to cause a computer to:
    automatically traverse a network interconnecting a set of databases in a distributed database system, to identify a plurality of paths, at least a path in said plurality of paths starting in a source database in said set and ending in a destination database in said set;
    automatically obtain a group of statistics on performance of a plurality of components in said distributed database system by querying at least said source database and said destination database;
    wherein said plurality of components comprises at least a first process of said source database, a second process of said destination database, and said path between said source database and said destination database;
    automatically generate at least one display comprising an identifier of said path and physically adjacent thereto statistics in said group associated with said path;
    apply a number of thresholds to said statistics to identify multiple databases in said path for not causing a bottleneck and remove said multiple databases from said set to obtain a new subset; and
    use said statistics to identify from said new subset, a specific database for having a process with a largest value of busy time, wherein said statistics comprise said busy time.

6. The non-transitory computer-readable storage medium of claim 5 wherein:
    said statistics in said group comprise at least a first duration of time during which a database in said set is awaiting receipt of a first message; and
    said statistics in said group further comprise at least a second duration of time during which said database is awaiting transmission of a second message.

7. The non-transitory computer-readable storage medium of claim 5 further comprising:
    instructions to apply predetermined rules to said statistics to identify a component in said path as causing the bottleneck in said path.

8. The non-transitory computer-readable storage medium of claim 5 further comprising:
    instructions to apply a predetermined rule to said statistics identify as causing the bottleneck, a component in another path having said specific database as another source database of said another path.

9. A computer comprising a processor and a memory coupled to the processor, the memory comprising a plurality of instructions, said plurality of instructions comprising:
    instructions to traverse a network interconnecting a set of databases in a distributed database system, to identify a plurality of paths starting in source databases and ending in destination databases;
    instructions to obtain statistics on a plurality of components in said distributed database system;
    instructions to apply a number of thresholds to said statistics to identify at least one database in a path for not causing a bottleneck and remove said at least one database from said set to obtain a new subset;
    instructions to use said statistics to identify from said new subset, a specific database for having a process with a highest busy time, wherein said statistics comprise busy time; and
    instructions to store in said memory an identity of said specific database.

10. The computer of claim 9 wherein:
said statistics in said group comprise at least a first duration of time during which a database in said set is awaiting receipt of a first message; and
said statistics in said group further comprise at least a second duration of time during which said database is awaiting transmission of a second message.

11. The computer of claim 9 wherein the memory further comprises:
instructions to apply predetermined rules to said statistics to identify a component in said path as a bottleneck in said path.

12. The computer of claim 9 wherein the memory further comprises:
instructions to apply a predetermined rule to said statistics identify as a bottleneck, a component in another path having said specific database as another source database of said another path.

13. An apparatus comprising:
means for traversing a network interconnecting a set of databases in a distributed database system, to identify a plurality of paths starting in source databases and ending in destination databases;
means for obtaining statistics on a plurality of components in said distributed database system;
means for applying a number of thresholds to said statistics to identify at least one database in a path for not causing a bottleneck and remove said at least one database from said subset to obtain a new subset;
means for using said statistics to identify from said new subset, a specific database for having a process with a highest busy time, wherein said statistics comprise busy time; an
means for storing in said memory an identity of said specific database.

14. The apparatus of claim 13 wherein:
said statistics in said group comprise at least a first duration of time during which a database in said set is awaiting receipt of a first message; and
said statistics in said group further comprise at least a second duration of time during which said database is awaiting transmission of a second message.

15. The apparatus of claim 13 further comprising:
means for applying predetermined rules to said statistics to identify a component in said path as a bottleneck in said path.

16. The apparatus of claim 13 further comprising:
means for applying a predetermined rule to said statistics identify as a bottleneck, a component in another path having said specific database as another source database of said another path.

17. A computer-implemented method comprising:
traversing a network interconnecting a set of databases in a distributed database system, to identify a plurality of paths starting in source databases and ending in destination databases;
obtaining statistics on a plurality of components of said databases, said statistics comprising at least a first duration of time during which a component in a path is awaiting receipt of a first message from an upstream component in said path, said statistics further comprising at least a second duration of time during which said component is awaiting transmission of a second message to a downstream component in said path;
applying at least one threshold to said statistics to identify at least one database in said path for not causing a bottleneck and removing said at least one database from said subset to obtain a new subset;
using said statistics to identify from said new subset, a specific database for having a process with a highest busy time, wherein said statistics comprise busy time; and
storing in a computer memory an identity of said specific database.

18. The computer-implemented of claim 17 further comprising:
retrieving from said computer memory said statistics for each path in the plurality of paths, and displaying on a video monitor said statistics in association with an identifier of said each path.

\* \* \* \* \*

UNITED STATES PATENT AND TRADEMARK OFFICE
CERTIFICATE OF CORRECTION

| | | |
|---|---|---|
| PATENT NO. | : 8,095,507 B2 | Page 1 of 2 |
| APPLICATION NO. | : 12/189115 | |
| DATED | : January 10, 2012 | |
| INVENTOR(S) | : Wu et al. | |

It is certified that error appears in the above-identified patent and that said Letters Patent is hereby corrected as shown below:

On Title page, Item (75) in column 1, under "Inventors", line 2, delete "S" and insert -- S. --, therefor.

On Title page, Item (57) in column 2, under "Abstract", line 11, delete "e.g." and insert -- e.g., --, therefor.

On Title page 2, Item (56) in column 1, under "Other Publications", line 2, delete "VLBD" and insert -- VLDB --, therefor.

In column 4, line 51-60, delete "Depending on the............can be analyzed." and insert the same on col. 4, line 52 as a new paragraph.

In column 6, line 15-31, delete "The statistics display.............of the invention." and insert the same on col. 6, line 16 as a new paragraph.

In column 6, line 48-56, delete "A capture component............and APS")." and insert the same on col. 6, line 49 as new paragraph.

In column 6, line 65, delete "65.%" and insert -- 65% --, therefor.

In column 7, line 33-46, delete "The component............258-263." and insert the same on col. 7, line 34 as a new paragraph.

In column 9, line 43-59, delete "Specifically, in act...............in act 203." and insert the same on col. 9, line 44 as a new paragraph.

In column 10, line 36-37, delete "PROPGATION" and insert -- PROPAGATION --, therefor.

In column 11, line 24-50, delete "The flow control time for a process in a source database is the time during which the process is waiting to transmit messages to another process which may be in an Signed and Sealed this
Fifth Day of June, 2012

David J. Kappos
*Director of the United States Patent and Trademark Office*

CERTIFICATE OF CORRECTION (continued)
U.S. Pat. No. 8,095,507 B2 intermediate database or in a destination database, i.e. the other process is downstream. The idle time for a process is the time during which the process is waiting to receive messages from another process which may be in an intermediate database or in a source database, i.e. upstream. Moreover, time during which a process handles messages constitutes the busy time of the process. Accordingly, as illustrated in FIG. 4B, a process A in a path 410 has idle time 413A, busy time 412A and flow control time 411A. Similarly, process B in path 410 has idle time 413B, busy time 412B and flow control time 411B. Finally, process C in path 410 has idle time 413C, busy time 412C and its flow control time is zero (not shown in FIG. 4B). To summarize, a process of a distributed database system in some embodiments of the invention has two durations in which it waits for other processes: (1) an idle time in which it awaits receipt of a message to be processed and (2) a flow control time in which it awaits transmission of a message that has already been processed.

Measurement of duration of two types of wait states of a database process individually, namely measurement of time spent waiting for an upstream process and measurement of time spent waiting for a downstream process has heretofore not been done in any distributed database system known to the inventors of the current patent application." And
insert -- The flow control time for a process in a source database is the time during which the process is waiting to transmit messages to another process which may be in an intermediate database or in a destination database, i.e. the other process is downstream. The idle time for a process is the time during which the process is waiting to receive messages from another process which may be in an intermediate database or in a source database, i.e. upstream. Moreover, time during which a process handles messages constitutes the busy time of the process. Accordingly, as illustrated in FIG. 4B, a process A in a path 410 has idle time 413A, busy time 412A and flow control time 411 A. Similarly, process B in path 410 has idle time 413B, busy time 412B and flow control time 411B. Finally, process C in path 410 has idle time 413C, busy time 412C and its flow control time is zero (not shown in FIG. 4B).

To summarize, a process of a distributed database system in some embodiments of the invention has two durations in which it waits for other processes: (1) an idle time in which it awaits receipt of a message to be processed and (2) a flow control time in which it awaits transmission of a message that has already been processed. Measurement of duration of two types of wait states of a database process individually, namely measurement of time spent waiting for an upstream process and measurement of time spent waiting for a downstream process has heretofore not been done in any distributed database system known to the inventors of the current patent application. --, therefor.

In column 14, line 27-28, delete "inittrans" and insert -- initrans --, therefor.

In column 18, line 44, after "component" insert -- . --.

In column 23, line 64, in Claim 4, delete "1," and insert -- 1 --, therefor.

In column 25, line 32, in Claim 13, delete "an" and insert -- and --, therefor.

In column 26, line 33, in Claim 18, delete "of claim" and insert -- method of claim --, therefor.